US007617127B2

(12) United States Patent
Hunt et al.

(10) Patent No.: US 7,617,127 B2
(45) Date of Patent: Nov. 10, 2009

(54) APPROACH FOR ESTIMATING USER RATINGS OF ITEMS

(75) Inventors: Neil Duncan Hunt, Mountain View, CA (US); Stanley Miguel Lanning, La Honda, CA (US); W. Reed Hastings, Santa Cruz, CA (US); Shawn Michael Purcell, Palo Alto, CA (US); Lawrence Wen-Kai Shih, San Jose, CA (US); John Robert Ciancutti, Saratoga, CA (US)

(73) Assignee: Netflix, Inc., Los Gatos, CA (US)

( * ) Notice: Subject to any disclaimer, the term of this patent is extended or adjusted under 35 U.S.C. 154(b) by 492 days.

(21) Appl. No.: 10/773,843

(22) Filed: Feb. 6, 2004

(65) Prior Publication Data

US 2005/0125307 A1 Jun. 9, 2005

(51) Int. Cl.
*G06Q 30/00* (2006.01)

(52) U.S. Cl. .......................................... 705/26; 705/37

(58) Field of Classification Search .................. 705/26, 705/37

See application file for complete search history.

(56) References Cited

U.S. PATENT DOCUMENTS 4,839,505 A 6/1989 Brandt et al.
5,095,195 A 3/1992 Harman et al.
5,664,110 A 9/1997 Green et al.
5,704,017 A 12/1997 Heckerman et al.
5,790,426 A 8/1998 Robinson
5,812,641 A 9/1998 Kanoh et al.

(Continued)

FOREIGN PATENT DOCUMENTS

JP 08057043 2/1996

(Continued)

OTHER PUBLICATIONS

Business Wire, "Leading Online E-Commerce and Entertainment Retailers Endorse Andromedia's LikeMinds Personalization Server 3.0," New York: Jul. 15, 1999, located on the internet at http://proquest.umi.com/psdweb?did=43177068&sid=13&Fmt=3&clientId=19649&RQT=309&VName=PQD, retrieved on Apr. 16, 2007, 4 pages.

(Continued)

*Primary Examiner*—James Zurita
(74) *Attorney, Agent, or Firm*—Hickman Palermo Truong & Becker LLP

(57) ABSTRACT

According to another embodiment of the invention, an approach is provided for estimating how a particular user would rate a particular item from a plurality of items. The approach is applicable to any type of items, including rental items such as movies, music and games, and the invention is not limited to any particular type of item. One or more items from the plurality of items that have ratings similar to the particular item are identified. Then, one or more other users are identified that have given ratings to the one or more items that are substantially similar to ratings given by the particular user to the one or more items. Finally, an estimation is made of how the particular user would rate the particular item based upon ratings for the particular item given by the one or more other users.

81 Claims, 11 Drawing Sheets

U.S. PATENT DOCUMENTS 5,842,199 A 11/1998 Miller et al.
5,867,799 A 2/1999 Lang et al.
5,884,282 A 3/1999 Robinson
5,909,638 A 6/1999 Allen
5,918,014 A 6/1999 Robinson
5,918,213 A 6/1999 Bernard et al.
5,983,214 A 11/1999 Lang et al.
6,012,052 A 1/2000 Altschuler et al.
6,016,475 A 1/2000 Miller et al.
6,029,161 A 2/2000 Lang et al.
6,041,311 A 3/2000 Chislenko et al.
6,049,777 A 4/2000 Sheena et al.
6,092,049 A 7/2000 Chislenko et al.
6,108,493 A 8/2000 Miller et al.
6,112,186 A 8/2000 Bergh et al.
6,236,985 B1 5/2001 Aggarwal et al.
6,266,649 B1 * 7/2001 Linden et al. ................ 705/26
6,286,139 B1 9/2001 Decinque
6,308,168 B1 10/2001 Dovich et al.
6,321,179 B1 11/2001 Glance et al.
6,321,221 B1 11/2001 Bieganski
6,330,592 B1 12/2001 Makuch et al.
6,334,127 B1 12/2001 Bieganski et al.
6,389,372 B1 5/2002 Glance et al.
6,412,012 B1 6/2002 Bieganski et al.
6,484,123 B2 11/2002 Srivastava
6,487,539 B1 11/2002 Aggarwal et al.
6,487,541 B1 11/2002 Aggarwal et al.
6,496,816 B1 12/2002 Thiesson et al.
6,782,370 B1 8/2004 Stack
6,799,165 B1 9/2004 Boesjes
6,996,606 B2 2/2006 Hasegawa
7,012,520 B2 3/2006 Webb, Sr.
7,046,138 B2 5/2006 Webb, Sr.
7,054,834 B2 5/2006 Hatakeyama
7,055,741 B2 6/2006 Bong et al.
7,058,581 B1 6/2006 Young
7,174,568 B2 2/2007 Chatani et al.
7,181,758 B1 2/2007 Chan
2004/0153413 A1 8/2004 Gross
2004/0158503 A1 8/2004 Gross
2004/0158504 A1 8/2004 Gross
2004/0162783 A1 8/2004 Gross
2004/0172274 A1 9/2004 Gross
2004/0172275 A1 9/2004 Gross
2004/0172342 A1 9/2004 Gross
2004/0243479 A1 12/2004 Gross
2004/0243480 A1 12/2004 Gross
2004/0267669 A1 12/2004 Gross
2005/0086127 A1 4/2005 Hastings et al.
2006/0149685 A1 7/2006 Gross

FOREIGN PATENT DOCUMENTS

JP 2001243285 A 9/2001
WO WO 9105307 4/1991

OTHER PUBLICATIONS

Kenton County Public Library, The talking Book Library of Northern KY, Kenton County Public Library information page. Retrieved from the internet at <http://www.kenton.lib.ky.us/information/talking.html>, Retrieval date unknown, 2 pages.

Proquest, "NetFlix launches DVD subscriptions club; Blockbuster set to stock up on format," Billboard, New York, Oct. 16, 1999, vol. 111, Iss. 42, p. 77, 1 page.

Proquest, "NetFlix.com Transforms DVD Business Eliminating Late Fees and Due Dates From Movie Rentals; NetFlix.com's New Marquee Program Creates Near 'DVD-on-Demand'," Business Wire, New York, Sep. 28, 1999, 1 page.

"Facts About the Library," a section of book entitled "Oh! Say. Can You See . . . " 1992 American Action Fund for Blind Children and Adults, retrieved from http://web.archive.org/web/20000104114940/www.actionfund.org/saysee09.htm, 2 pages.

Application for Library Services for the Kenneth Jernigan Library for Blind-Children, last updated May 27, 1999, retrieved from http://web.archive.org/web/19991103190509/www.actionfund.org/kjlib.htm, 3 pages.

Audio Diversions Home Page, last updated Mar. 8, 1999 [online] retrieved on Feb. 26, 2004 from http://web.archive.org/web/19990508140319/www.audiodiversions.com/audiodiversions-cgi/home.cgi; 2 pages.

Literature for Listening Club of Audio Diversions, last updated Mar. 12, 1999 [online] retrieved on Aug. 31, 2003 from http://web.archive.org/web/19990908120905/www.audiodiversions.com/audiodiversions-cgi/listening.cgi?id=0508075008; 2 pages.

Audiobook Search of Audio Diversions [online] retrieved on Aug. 31, 2003 from http://web.archive.org/web/19990908104726/www.audiodiversions.com/audiodiversions-cgi/catalog.cgi?id=0508075008, 2 pages.

Books On Tape Home page, Apr. 22, 1999 [online] retrieved on Aug. 31, 2003 from http://web.archive.org/web/19990424061355/http://www.booksontape.com/, 2 pages.

More About B-O-T® & Frequently Asked Questions, [online] retrieved on Aug. 31, 2003 from http://web.archive.org/web/19990508223402/http://www.booksontape.com/i/help.htm, 11 pages.

America's Online Door to Door Rental Store, 1999 copyright [online] retrieved from http://web.archive.org/web/19990922160527/http://www.dvdovernight.com/; 2 pages.

Getting Started, 1999 copyright [online] retrieved from http://web.archive.org/web/20000304111243/www.dvdovernight.com/started.html; 7 pages.

Top DVD Rentals, DVD Overnight Store Policies & Frequently Asked Questions, 1999 copyright [online] retrieved from http://web.archive.org/web/19991123014901/www.dvdovernight.com/service.html; 8 pages.

Customer Service Questions & Answers, 2000 copyright [online] retrieved from http://web.archive.org/web/20001109071400/www.dvdovernight.com/dvd/custservice.html; 5 pages.

DVD Cache Frequently Asked Questions, [online] retrieved from http://web.archive.org/web/20000512001209/www.dvdcache.com/store/customer_service.html; 5 pages.

Libraries [online] retrieved on Feb. 26, 2004 from http://www.archives.mcgill.ca/resources/guide/vol1/rg40.htm; 8 pages.

Fastlane Video & Records—Rental Prices [online] retrieved from http://web.archive.org/web/19990506190744/members.aol.com/atfastlane/video/rental.htm; 1 page.

5 Day Rental [online] retrieved from http://web.archive.org/web/19990210101315/members.aol.com/atfastlane/video/index.htm; 13 pages.

Fastlane Video & Records [online] retrieved from http://web.archive.org/web/19990209181937/members.aol.com/atfastlane/; 2 pages.

Fastlane Video & Records—Payment on Account [online] retrieved from http://web.archive.org/web/19990504102814/members.aol.com/atfastlane/video/payment.htm; 1 page.

"Try Before You Buy Program" [online] retrieved from http://web.archive.org/web/19990922040420/www.gametradersclub.com/gametradersclub/tryb.html; 2 pages.

Trade or Sell Your Games! [online] retrieved from http://web.archive.org/web/19991010012624/www.gametradersclub.com/gametradersclub/tradorselyou.html; 2 pages.

"Try Before You Buy Program" [online] retrieved from http://web.archive.org/web/19991012021059/gametradersclub.com/gametradersclub/tryb.html; 2 pages.

Print Culture and English Speaking Quebec [online] retrieved on Feb. 26, 2004 from http://www.hbic.library.utoronto.ca/fconfmcnally__fr.htm; 5 pages.

Welcome to Home Film [online] retrieved from http://web.archive.org/web/19961106000542/http://www.homefilmfestival.com/index.html; 3 pages.

Membership [online] retrieved from http://web.archive.org/web/19961106001054/www.homefilmfestival.com/membership.html; 2 pages.

It's Easy! Ordering info [online] retrieved from http://web.archive.org/web/19961106001006/www.homefilmfestival.com/infopack.html; 2 pages.
Online Video Rentals Multiple Rental Order Form [online] retrieved on Jul. 2, 2003 from http://web.archive.org/web/19990420045928/www.homefilmfestival.com/lrgordr.html; 3 pages.
Online Video Rentals Individual Rental Order [online] retrieved on Jul. 2, 2003 from http://web.archive.org/web/19990127160422/www.homefilmfestival.com/indordr.html; 3 pages.
Magic Disc Entertainment [online] retrieved on Feb. 27, 2004 from http://web.archive.org/web/19981206142316/http://www.magicdisc. com/; 2 pages.
Rental Program [online] retrieved from http://web.archive.org/web/19990503073644/www.magicdisc.com/rentals/rentalprogram.htm; 3 pages.
Featured DVDs for Saturday, Jan. 16, 1999, 1997-1999 copyright [online] retrieved on Jul. 3, 2003 from http://web.archive.org/web/19990117011532/http://www.netflix.com/; 5 pages.
DVD Favorites, 1997-1999 copyright [online] retrieved on Jul. 3, 2003 from http://web.archive.org/web/19991204131346/www.netflix.com/sf/favorites.asp?sid=14; 4 pages.
Future Reflections, Barbara Cheadle, vol. 12, No. 1 Winter, 1993 [online] retrieved on Aug. 23, 2003 from http://www.nfb.org/fr/fr1/93win.htm; pp. 1-2; 70-72.
Hear Ye! Hear Ye! National Federation of the Blind archived in Feb. 1999 retrieved from http://web.archive.org/web/19991112190729/www.nfb.org/fr98ws20.htm, 7 pages.
E-mail posting: Newsgroups: alt.games.video.sony-playstation from:David Esposito (cooldej@home.com) with subject: Need Cheep Games; Date: Feb. 7, 1999; 1 page.
E-mail posting: Newsgroups: alt.games.video.sony-playstation from: ramon (ramon@theriver.com) with subject: Need Cheep Games; Date: Feb. 8, 1999; 1 page. (same page as Esposito posting).
E-mail posting: Newsgroups: alt.games.video.sony-playstation from: ramon (ramon@theriver.com) with subject: 100'S of Games for About a Buck a Day . . . (Incredible Deal); Date: Feb. 6, 1999; 1 page.
E-mail posting: Newsgroups: alt.games.video.sony-playstation from: ramon (ramon@theriver.com) with subject: Best Deal Around 100's of games for about a buck a day; Date: Feb. 8, 1999; 1 page.
E-mail posting: Newsgroups: alt.games.video.sony-playstation from: ramon (ramon@theriver.com) with subject: Best Deal I've Ever Seen . . . 100's of games for about a buck a day; Date: Feb. 8, 1999; 1 page.
E-mail posting: Newsgroups: alt.games.video.sony-playstation from: ramon (ramon@theriver.com) with subject: Best Deal Ever!! Choose from 100's of games for about a buck a day . . . Plus a Free Playstation; Date: Feb. 8, 1999; 1 page.
E-mail postings of 6 messages in a thread from the following message: Newsgroups: alt.games.video.sony-playstation from: ramon (ramon@theriver.com) with subject: Best Deal Ever . . . All the N-64 Games You Want for About a Buck a Day; Date: Feb. 10, 1999; 3 pages.
E-mail posting: Newsgroups: alt.games.video.sony-playstation from: ramon (ramon@theriver.com) with subject: All the New Playstation Games are Yours for About a Buck a Day; Date: Feb. 10, 1999; 1 page.
E-mail posting: Newsgroups: alt.games.video.sony-playstation from: ramon (ramon@theriver.com) with subject: Check Out the New Web Site (Best Deal I've Seen); Date: Jul. 11, 1999; 1 page.
E-mail posting: Newsgroups: alt.games.video.sony-playstation from: ramon (ramon@theriver.com) with subject: How Many Games Can You Beat In a Month?; Date: Jul. 11, 1999; 1 page.
"A New Way to Avoid Exercise", Newsweek Mar. 15, 1999; 1 page.
Additional Information from Sally Fry, Community Relations Coordinator Unabashed Librarian, No. 82, p. 3 1991.
Mailbox Access to Your Library (MAYL), Florida Libraries, Unabashed Librarian, No. 82, p. 3 1991.
Glenn Miller, Letter from Glen Miller, Director of Orange County Library System, Unabashed Librarian, No. 82, p. 3 1991.
Brass, Kevin, "Company Town; Rental Control; Video Distributor Takes Industry Down Controversial Path", *Los Angeles Times*, Nov. 28, 1997; 4 pages.
Mary L. Daniels, A Love for Libraries; Whether Large or Small, They are Special Places, Editorial; p. A19, Orlando Sentinel, Nov. 11, 1994; 2 pages; 2 pages.
DeJong, Jennifer, "Securing Your Site for the Age of E-Commerce", VAR Business Strategy Guide Supplement Nov. 16, 1998; 3 pages.
"Door-to-Door Service", High Points, Feb. 1999; vol. 6, No. 2, p. 50, 2 pages.
Greenemeier, Larry, "Manna Rises Above Conventional"; Net Marketing; Manna Network Technologies Midrange Systems, Dec. 18, 1998; No. 18, vol. 11; p. 41; 2 pages.
Hilda M. Hamlyn, "Eighteenth-century circulating libraries in England," The Library, pp. 197-222, Dec. 1946.
Horowitz, Alan, S., "PC Leasing Gains Ground—Shorter life spans popularize practice", Information Week, May 25, 1998, 3 pages.
Ingram, Bob, "Boston Bears Watching" Supermarket Business Mar. 1, 1999; 5 pages.
Kim, Nancy J., "Nordstrom seen Net gains with Streamline", Puget Sound Business Journal Oct. 30, 1998; 2 pages.
Alan Donald McKillop, "English circulating libraries, 1725-50" The Library, pp. 477-485, Mar. 1934.
Memmott, Carol, "Web Site Streamlines Your Errands", USA Today Nov. 16, 1998; 2 pages.
"News Briefs", Video Store Mar. 21, 1999; 1 page.
"Nordstrom Announces Partnership With Streamline", PR NewsWire Oct. 8, 1998; 2 pages.
Said, Carolyn, "Chips and Flicks On Your Doorstep", Business, p. B1, The San Francisco Chronicle, Oct. 18, 1999, 4 pages.
Shrieves, Linda, "Now Library Books Just Show Up at Your Door", Orlando Sentinel, Dec. 7, 1990; 2 pages.
"Streamline" DSN SuperCenter Club Business Mar. 29, 1999; 1 page.
Hal R. Varian, "Buying, renting, and sharing information goods," Technical report, School of Information Management and Systems, UC Berkeley, Dec. 1994; 20 pages.
Hal R. Varian, "Circulating Libraries and Video Rental Stores," Dec. 1996, retrieved from http://web.archive.org; pp. 1-14.
Hal R. Varian, et al., "Circulating Libraries and Video Rental Stores," University of Michigan, Dearborn, University of California, Berkeley, http://www.sims.berkeley.edu/~hal/Papers/history/history.html, Mar. 2000; pp. 1-13.
Griest, Guinevere L.: Mudie's Circulating Library and the Victorian Novel. Bloomington and London, Indiana, Univ. Press, 1970, 282 pages.
*Books by Mail, a handbook for libraries* (1977) by Choong H. Kim. In the Quebec section at p. 394, the *McLennan Traveling Libraries of McGill University* were reviewed, 2 pages.
James Lardner, *Fast Forward: Hollywood, the Japanese and the Onslaught of the VCR* by, Chapter 12 Wilbur & Orville & Tom, Dick, & Harry and Chapter 13 The Rental Wars, pp. 168-202 (1987).
Abigail A. Loomis, "Subscription libraries," in Wayne A. Wiegand and Jr. Donald G. Davis, editors, Encyclopedia of Library History, pp. 608-610. Garland Publishing, Inc., New York & London, 1994.
Glenn Miller *Customer Service & Innovation in Libraries* pp. 73-90, Highsmith Press 1996. ("Book").
Brad Dick, Editor, "The Future of Television," Broadcast Engineering, NA, Dec. 1999, 1 page.
"About Us" web page from www.netflix.com, 1 page.
Web page printout for http://www.netflix.com/ on Jan. 17, 1999, at http://web.archive.org/web/19990117080920/ http://www.netflix.com, 5 pages.
International Searching Authority, "Notification of Transmittal of The International Search Report or The Declaration", International application No. PCT/US04/43119, dated Sep. 21, 2007, 7 pages.
Claims, International application No. PCT/US04/43119, 28 pages.
Intellectual Property Office of New Zealand ,"Examination Report", foreign patent application No. 548986, dated Oct. 31, 2008, 3 pages.
Current Claims for New Zealand foreign application No. 548986, 23 pages.
International Bureau of WIPO, "International Preliminary Report on Patentablility", International application No. PCT/US2005/003377, dated Oct. 16, 2008, 7 pages.

* cited by examiner

300
START
302
DELIVER INITIAL/NEXT ITEMS TO CUSTOMER
304
NO
ITEM DELIVERY CRITERIA SATISFIED?
306
YES
NO
SPECIFIED NUMBER OF ITEMS DELIVERED?
308
YES
YES
OVERRIDE SPECIFIED NUMBER OF ITEMS?
310
NO
END
312

400
START
402
CUSTOMER AND PROVIDER NEGOTIATE TERMS OF "MAX TURNS" AGREEMENT
404
INITIAL/NEXT ITEMS DELIVERED TO CUSTOMER
406
CAN ADDITIONAL ITEMS BE PROVIDED WITHIN TERMS OF "MAX TURNS" AGREEMENT?
408
YES
NO
OVERRIDE CURRENT AGREEMENT TERMS?
410
YES
CHANGE AGREEMENT TERMS AND/OR APPLY SURCHARGE
412
NO
WAIT UNTIL NEXT RENTAL PERIOD
414
END
416

Figure 7:
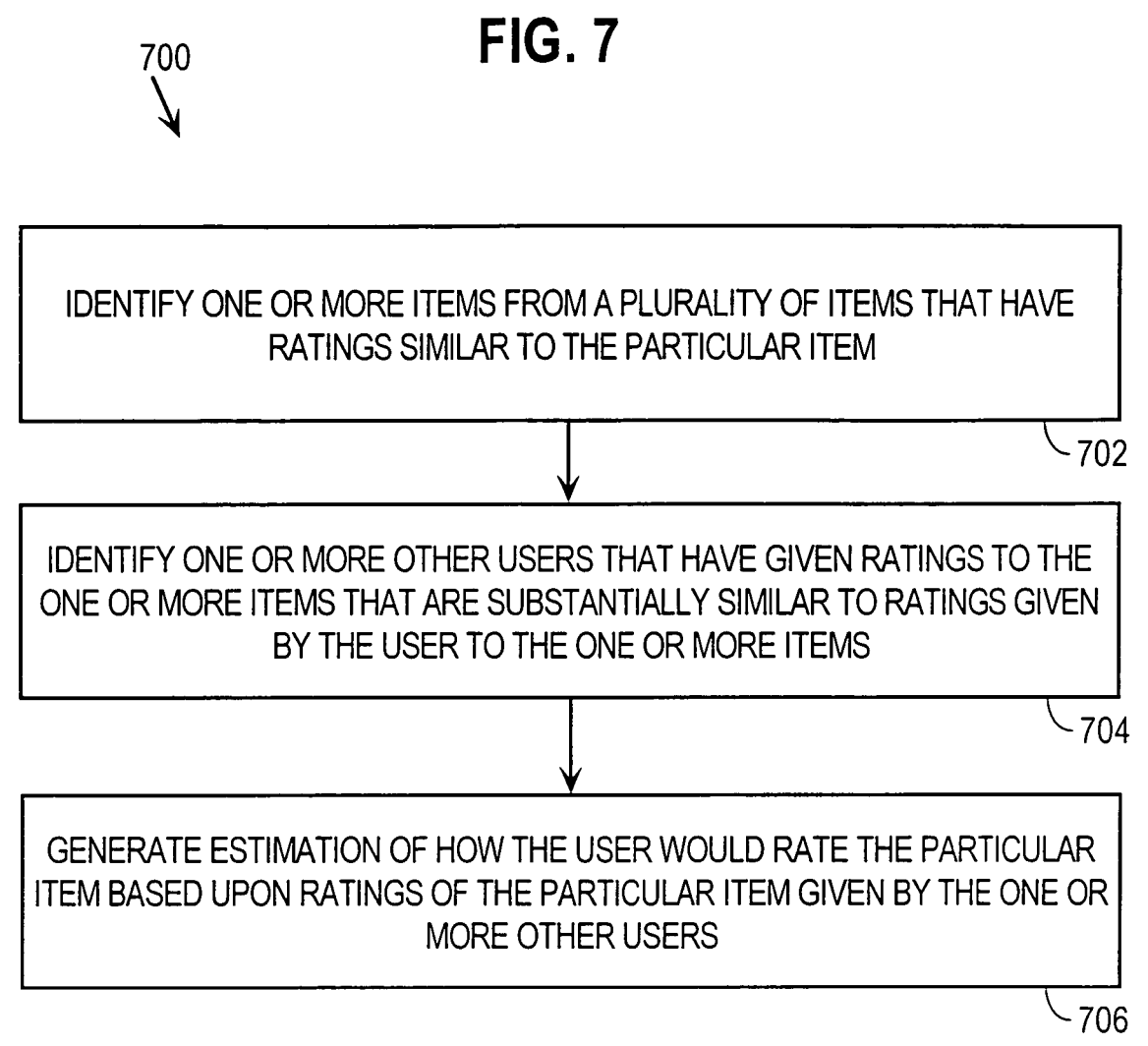

IDENTIFY ONE OR MORE ITEMS FROM A PLURALITY OF ITEMS THAT HAVE RATINGS SIMILAR TO THE PARTICULAR ITEM

702

IDENTIFY ONE OR MORE OTHER USERS THAT HAVE GIVEN RATINGS TO THE ONE OR MORE ITEMS THAT ARE SUBSTANTIALLY SIMILAR TO RATINGS GIVEN BY THE USER TO THE ONE OR MORE ITEMS

704

GENERATE ESTIMATION OF HOW THE USER WOULD RATE THE PARTICULAR ITEM BASED UPON RATINGS OF THE PARTICULAR ITEM GIVEN BY THE ONE OR MORE OTHER USERS

706

900
904
RECOMMENDATION SYSTEM
NON-VOLATILE STORAGE 908
DATA FILE 914
RECOMMENDATION ENGINE 906
RATINGS AND PREDICTION DATA 912
TASK QUEUE 916
RATINGS DB 910
WEB SERVER 902

DISPLAY 1112
INPUT DEVICE 1114
CURSOR CONTROL 1116
MAIN MEMORY 1106
ROM 1108
STORAGE DEVICE 1110
BUS 1102
PROCESSOR 1104
COMMUNICATION INTERFACE 1118
1100
NETWORK LINK 1120
LOCAL NETWORK 1122
HOST 1124
INTERNET
ISP
1126
1128
SERVER 1130

APPROACH FOR ESTIMATING USER RATINGS OF ITEMS

FIELD OF THE INVENTION

The present invention relates to inventory rental, and more specifically, to an approach for estimating user ratings of items.

BACKGROUND OF THE INVENTION

Conventional inventory rental models are typically based upon renting items for fixed rental periods and charging late fees for keeping rented items beyond a specified return date. As used herein, the term "item" refers to any item of commerce. These types of inventory models suffer from several significant limitations. First, conventional rental models require customers to make the decision of what items to rent at substantially the same time as the decision of when to rent the items. An example that illustrates this limitation is a video rental business. Customers go to a video rental store and select particular movies to rent at that time. The customers take the movies home and must return them by a particular due date or be charged a late fee. In this situation, the customers cannot decide what movies to rent before actually renting them. The customers may have a particular movie in mind, but there is no guarantee that the video rental store has the particular movie in stock. Moreover, due dates are inconvenient for customers, particularly for "new release" movies that are generally due back the next day.

Given the current demand for inventory rental and the limitations in the prior approaches, an approach for renting items to customers that does not suffer from limitations associated with conventional inventory rental models is highly desirable. In particular, an approach for renting inventory items to customers that allows separation of customers' decisions of what items to rent from when to rent the items is highly desirable.

There is a further need for an approach for renting items to customers on a continuous basis that avoids the use of fixed due dates or rental "windows" appurtenant to conventional rental models.

There is yet a further need for an approach for renting movies, games and music to customers that is more convenient and flexible to customers than conventional approaches.

There is also a need for an approach for estimating how a user would rate an item that the user has not yet rated.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 7 is a flow diagram that depicts an approach for estimating how a user would rate an item according to an embodiment of the invention.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Various aspects and features of example embodiments of the invention are described in more detail hereinafter in the following sections:

I. FUNCTIONAL OVERVIEW
II. ITEM SELECTION CRITERIA
III. ITEM DELIVERY
IV. "MAX OUT"
V. "MAX TURNS"
VI. INVENTORY MANAGEMENT
VII. ITEM RECOMMENDATION
VIII. IMPLEMENTATION MECHANISMS

I. Functional Overview

Figure 1:
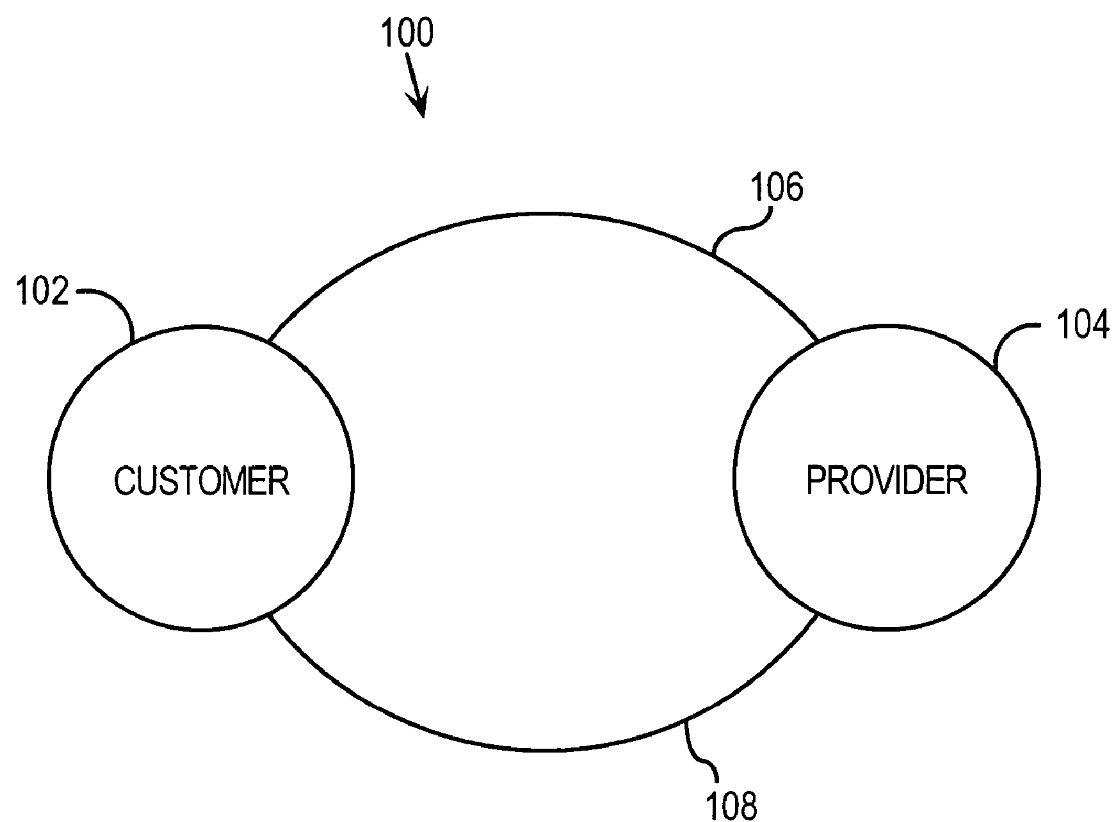
FIG. 1 is a diagram depicting an approach for renting items to customers according to an embodiment.

FIG. 1 is a block diagram 100 that illustrates an approach for renting items to customers according to various embodiments described herein. As used herein, the term "items" refers to any commercial goods that can be rented to customers. Examples of items include movies, music and games stored on a non-volatile memory such as a tape, other magnetic medium, optical medium, read-only memory or the like, and the invention is not limited to any particular type of item. In general, the decision of what items to rent is separated from the decision of when to rent the items. Customers may specify what items to rent using one or more item selection criteria separate from deciding when to receive the specified items. Furthermore, customers are not constrained by conventional rental "windows" and instead can have continuous, serialized rental of items.

According to one embodiment, a customer 102 provides one or more item selection criteria to a provider 104 over a link 106. Link 106 may be any medium for transferring data between customer 102 and provider 104 and the invention is not limited to any particular medium. Examples of link 106 include, without limitation, a network such as a LAN, WAN or the Internet, a telecommunications link, a wire or optical link or a wireless connection.

The item selection criteria indicate items that customer 102 desires to rent from provider 104. In response to receiving the item selection criteria from customer 102, provider 104 provides the items indicated by the item selection criteria to customer 102 over a delivery channel 108. Delivery channel 108 may be implemented by any mechanism or medium that provides for the transfer of items from provider 104 to customer 102 and the invention is not limited to any particular type of delivery channel. Examples of delivery channel 108 include, without limitation, mail delivery, courier delivery or delivery using a delivery agent. Provider 104 may be centralized or distributed depending upon the requirements of a particular application.

According to an embodiment, a "Max Out" approach allows up to a specified number of items to be rented simultaneously to customer 102 by provider 104. According to another embodiment, a "Max Turns" approach allows up to a specified number of item exchanges to occur during a specified period of time. The "Max Out" and "Max Turns" approaches may be used together or separately with a variety of subscription methodologies.

Figure 2:
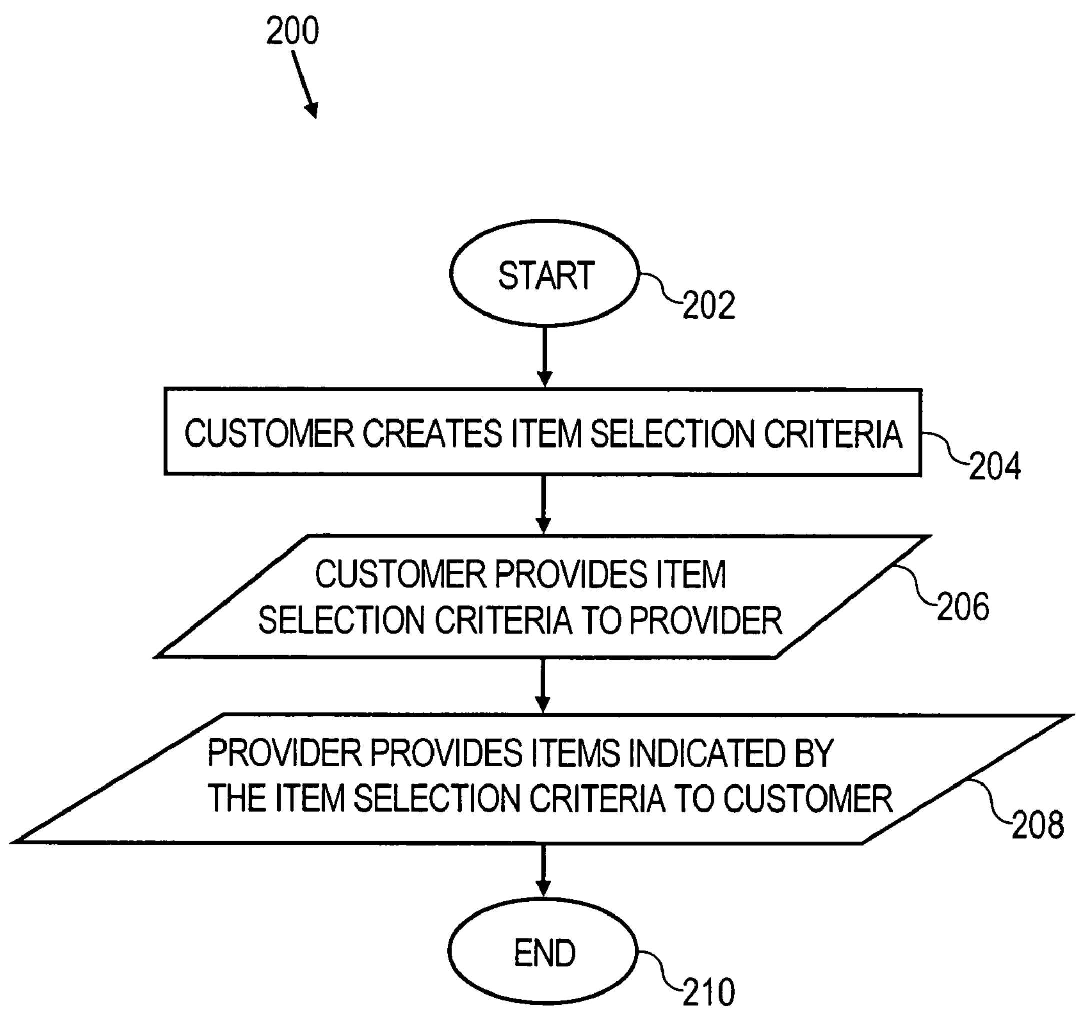
FIG. 2 is a flow diagram depicting an approach for renting items to customers according to an embodiment.

The approach just described for renting items to customers is now described with reference to a flow diagram 200 of FIG. 2. After starting in step 202, in step 204, customer 102 creates item selection criteria. In step 206, customer 102 provides the item selection criteria to provider 104. In step 208, in response to provider 104 receiving the item selection criteria from customer 102, provider 104 provides one or more items indicated by the item selection criteria to customer 102. The process is complete in step 210.

II. Item Selection Criteria

The one or more item selection criteria provided by customer 102 to provider 104 indicate the particular items that customer 102 desires to rent from provider 104. Thus, the item selection criteria define a customer-specific order queue that is fulfilled by provider 104. According to one embodiment, the item selection criteria specify attributes of items to be provided by provider 104 to customer 102. Item selection criteria may specify any type of item attributes and the invention is not limited to particular item attributes. Examples of item attributes include, without limitation, identifier attributes, type attributes and cost attributes. Item selection criteria may be changed at any time to reflect changes in items that customers desire to rent from a provider.

III. Item Delivery

According to one embodiment, items are delivered by provider 104 to customer 102 over delivery channel 108 based upon item delivery criteria. More specifically, the delivery of items from provider 104 to customer 102 is triggered by item delivery criteria being satisfied. The item delivery criteria may include a wide range of criteria and the invention is not limited to any particular item delivery criteria. Examples of item delivery criteria include, without limitation, customer request/notification, customer notification that an item is being returned, customer return of an item, the occurrence of a specified date, the elapsing of a specified period of time or a customer payment.

The item delivery criteria may be specified by customer 102 to provider 104 or negotiated by customer 102 and provider 104 as part of a subscription service. For example, a particular subscription service may include item delivery criteria that specifies that a particular number of items are to be delivered monthly. As another example, item delivery criteria may specify that an initial set of items is to be delivered by provider 104 to customer 102 upon initiation of a subscription service and that additional items are to be delivered to customer 102 upon return of items to provider 104. Item delivery criteria may be applied uniformly to all items to be delivered to a customer, or may be item specific. For example, item delivery criteria may specify a particular date, i.e., the third Wednesday of every month, for all item deliveries. Alternatively, separate item delivery dates may be assigned to each item.

IV. "Max Out"

According to one embodiment, a "Max Out" approach is used to manage the number of items that may be simultaneously rented to customers. According to the "Max Out" approach, up to a specified number of items may be rented simultaneously to a customer. Thus, the "Max Out" approach establishes the size of an inventory of items that may be maintained by customers. The specified number of items may be specific to each customer or may be common to one or more customers. In the present example, if the specified number of items is three, then up to three items may be rented simultaneously by provider 104 to customer 102. If the specified number of items are currently rented to customer 102 and the specified item delivery criteria triggers the delivery of one or more additional items, then those items are not delivered until one or more items are returned by customer 102 to provider 104.

According to one embodiment, in situations where the specified number of items are currently rented to customer 102 and the specified item delivery criteria triggers the delivery of one or more additional items, then the one or more additional items are delivered to customer 102 and customer 102 and a surcharge is applied customer 102. The specified number of items may then be increased thereafter to reflect the additional items delivered to customer 102 and increase the size of the inventory maintained by customer 102. Alternatively, the specified number of items may remain the same and number of items maintained by customer 102 returned to the prior level after items are returned to provider 104 by customer 102. When used in conjunction with the "Max Turns" approach described hereinafter, the specified number of items may be unlimited.

Figure 3:
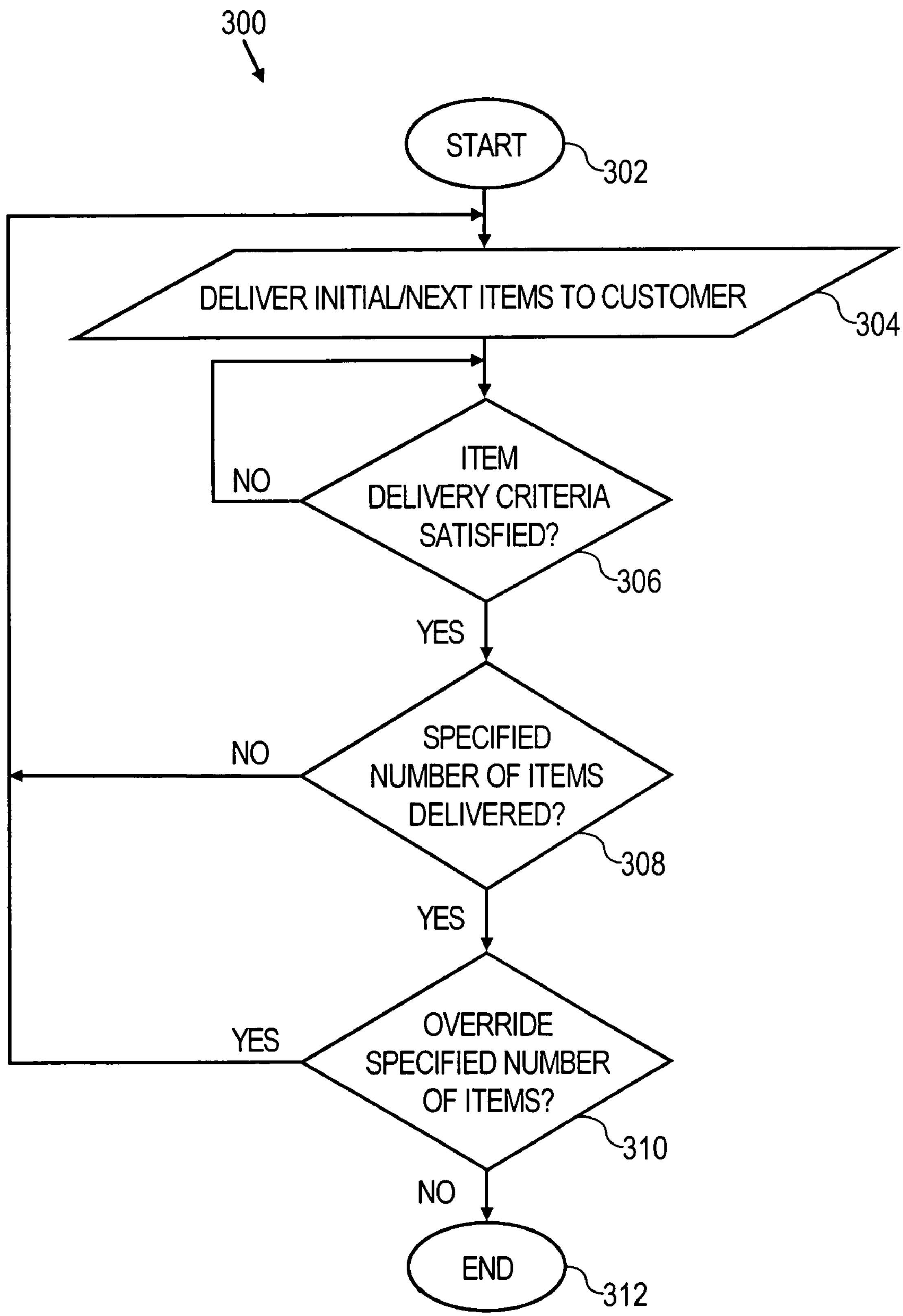
FIG. 3 is a flow diagram depicting a "Max Out" approach for renting items to customers according to an embodiment.

The "Max Out" approach for managing the number of items that may be simultaneously rented to customers is now described with reference to a flow diagram 300 of FIG. 3. After starting in step 302, in step 304, one or more initial items are delivered to customer 102 to establish the inventory maintained by customer 102. Note that an initial delivery of items is not required and according to one embodiment, the inventory of customer 102 is incrementally established over time.

In step 306, a determination is made whether the item delivery criteria have been satisfied. If not, then the determination continues to be made until the item delivery criteria are satisfied. As described previously herein, the delivery criteria may include customer notification generally, customer notification that an item is being returned, the actual return of an item, the occurrence of a specific date, or that a specified amount of time has elapsed.

Once the item delivery criteria are satisfied, then in step 308, a determination is made whether the specified number of items have been delivered. If not, then control returns to step 304 and one or more additional items are delivered by provider 104 to customer 102. If however, in step 308, the specified number of items have been delivered, then in step 310, a determination is made whether the specified number of items, i.e., the "Max Out" limit, is to be overridden. As previously described, the specified number of items may be overridden by increasing the specified number of items, i.e., the "Max Out" limit, to allow additional items to be delivered to customer 102 and charging a fee to customer 102. Alternatively, the specified number of items is not changed and a surcharge applied to customer 102. This process continues for the duration of the subscription and is then complete in step 312.

V. "Max Turns"

According to one embodiment, a "Max Turns" approach is used to rent items to customers. According to the "Max Turns" approach, up to a specified number of item exchanges may be performed during a specified period of time. For example, referring to FIG. 1, suppose that provider 104 agrees to rent items to customer 102 with a "Max Turns" limit of three items per month. This means that customer 102 may make up to three item exchanges per month. This approach may be implemented independent of the number of items that a customer may have rented at any given time under the "Max Out" approach. The approach is also independent of the particular item delivery criteria used.

According to one embodiment, the "Max Turns" approach is implemented in combination with the "Max Out" approach to rent items to customers. In this situation, up to a specified number of total items are simultaneously rented to customer 102 and up to a specified number of item exchanges may be made during a specified period of time. Thus, using the "Max Out" and the "Max Turns" approaches together essentially establishes a personal item inventory for customer 102 based upon the "Max Out" limit that may be periodically refreshed based upon the "Max Turns" limit selected.

In some situations, customer 102 may wish to exchange more than the specified number of items during a specified period. According to one embodiment, in this situation, provider 104 agrees to rent additional items above the specified number to customer 102 and to charge customer 102 for the additional items. For example, suppose that provider 104 agrees to rent items to customer 102 with up to three item turns (exchanges) per month. If, in a particular month, customer 102 requires two additional turns, then the two additional items are provided to customer 102 and a surcharge is applied to customer 102 for the additional two items.

In other situations, customer 102 may not use all of its allotted turns during a specified period. According to one embodiment, customers lose unused turns during a subscription period. For example, if customer 102 has a "Max Turns" limit of four item exchanges per month and only makes two item exchanges in a particular month, then the two unused exchanges are lost and cannot be used. At the start of the next month, customer 102 would be entitled to four new item exchanges.

According to another embodiment, customers are allowed to carry over unused turns to subsequent subscription periods. For example, if customer 102 has a "Max Turns" limit of four item exchanges per month and only makes two item exchanges in a particular month, then the two unused exchanges are lost and cannot be used. At the start of the next month, customer 102 would be entitled to six new item exchanges, two from the prior month and four for the current month.

Figure 4:
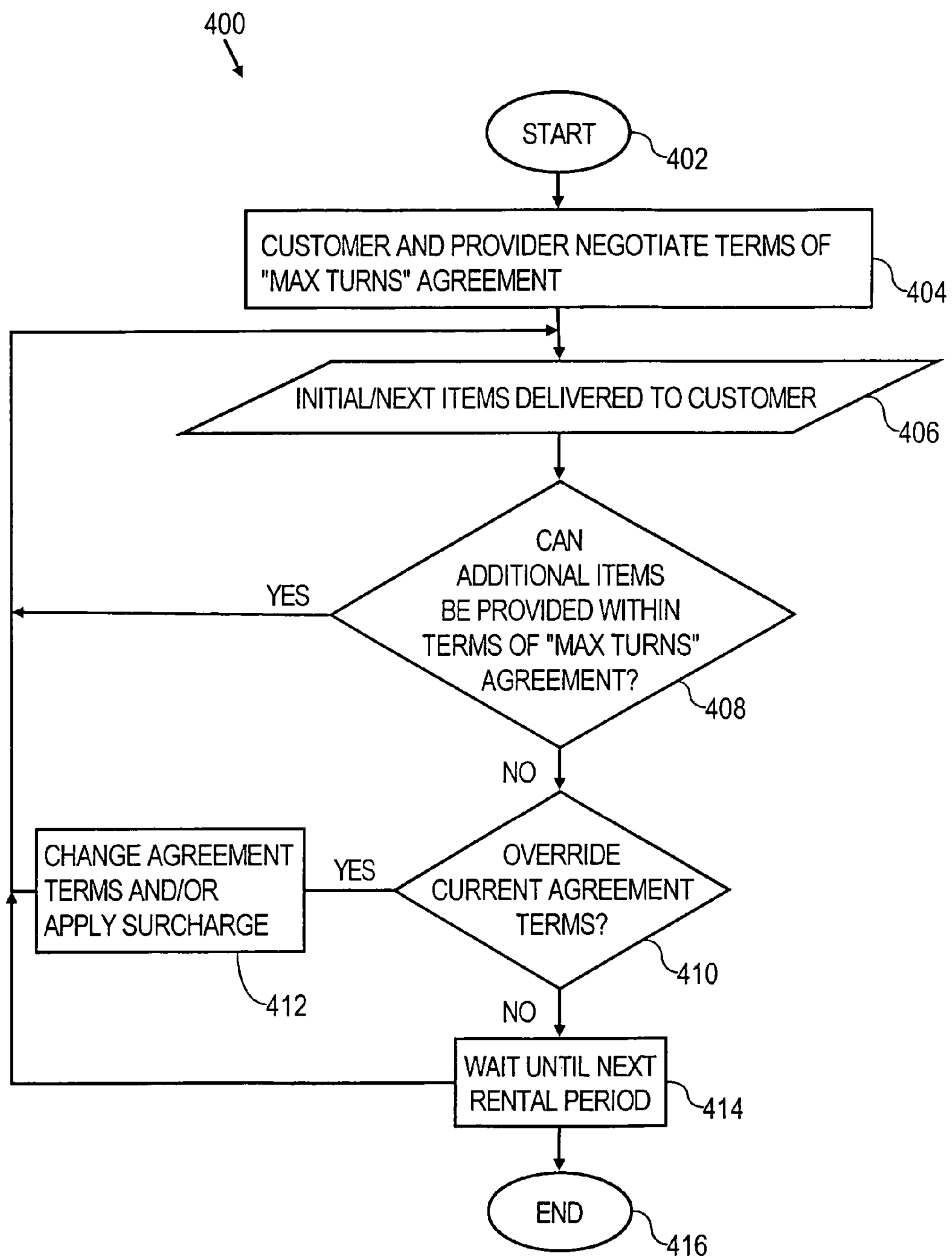
FIG. 4 is a flow diagram depicting a "Max Turns" approach for renting items to customers according to an embodiment.

The "Max Turns" approach for renting items to customers is now described with reference to a flow diagram 400 of FIG. 4. After starting in step 402, in step 404, customer 102 and provider 104 agree upon the terms of the "Max Turns" agreement. Specifically, customer 102 and provider 104 agree at least upon the maximum number of turns that are allowed in a specified period of time.

In step 406, in response to one or more item delivery criteria being satisfied, provider 104 provides one or more items to customer 102 over delivery channel 108. Any type of item delivery criteria may be used with the "Max Turns" approach and the invention is not limited to any particular delivery criteria. For example, the initial one or more items may be delivered to customer 102 in response to a subscription payment made by customer 102 to provider 104, the initiation of a specified subscription period, or by request of customer 102 for the initial-rental items. The number of initial one or more items must not exceed the terms of the "Max Turns"agreement.

In step 408, in response to one or more delivery criteria being satisfied, a determination is made whether additional items can be provided to customer 102 within the terms of the "Max Turns" agreement. For example, if the number of items rented to customer in the current subscription period is less than the agreed-upon "Max Turns," then additional items can be rented to customer 102 within the terms of the "Max Turns" agreement. In this situation, this determination may be made in response to customer 102 returning one or more items to provider 104, or by customer 102 requesting additional items.

If, in step 408, a determination is made that additional items can be rented to customer 102 within the terms of the "Max Turns" agreement, then control returns to step 406 where one or more additional items are rented to customer 102. If however, in step 408, a determination is made that additional items cannot be rented to customer 102 within the terms of the "Max Turns" agreement, then in step 410, a determination is made whether to override the current agreement terms. If so, then in step 412, the agreement terms are changed to allow for a larger number of terms and customer 102 is charged accordingly, or the terms are left unchanged and a surcharge is applied for the additional items to be delivered. Control then returns to step 406, where one or more additional items are delivered to customer 102.

If in step 410, a determination is made that the current agreement is not to be overridden, then in step 414, no items are delivered to customer 102 until the next subscription period. For example, the request for additional items may be received at the end of a subscription period and instead of renting the additional items immediately, they are instead delivered during the subsequent subscription period. Control then returns to step 406 where one or more additional items are rented to customer or the process is complete in step 416.

Figure 5:
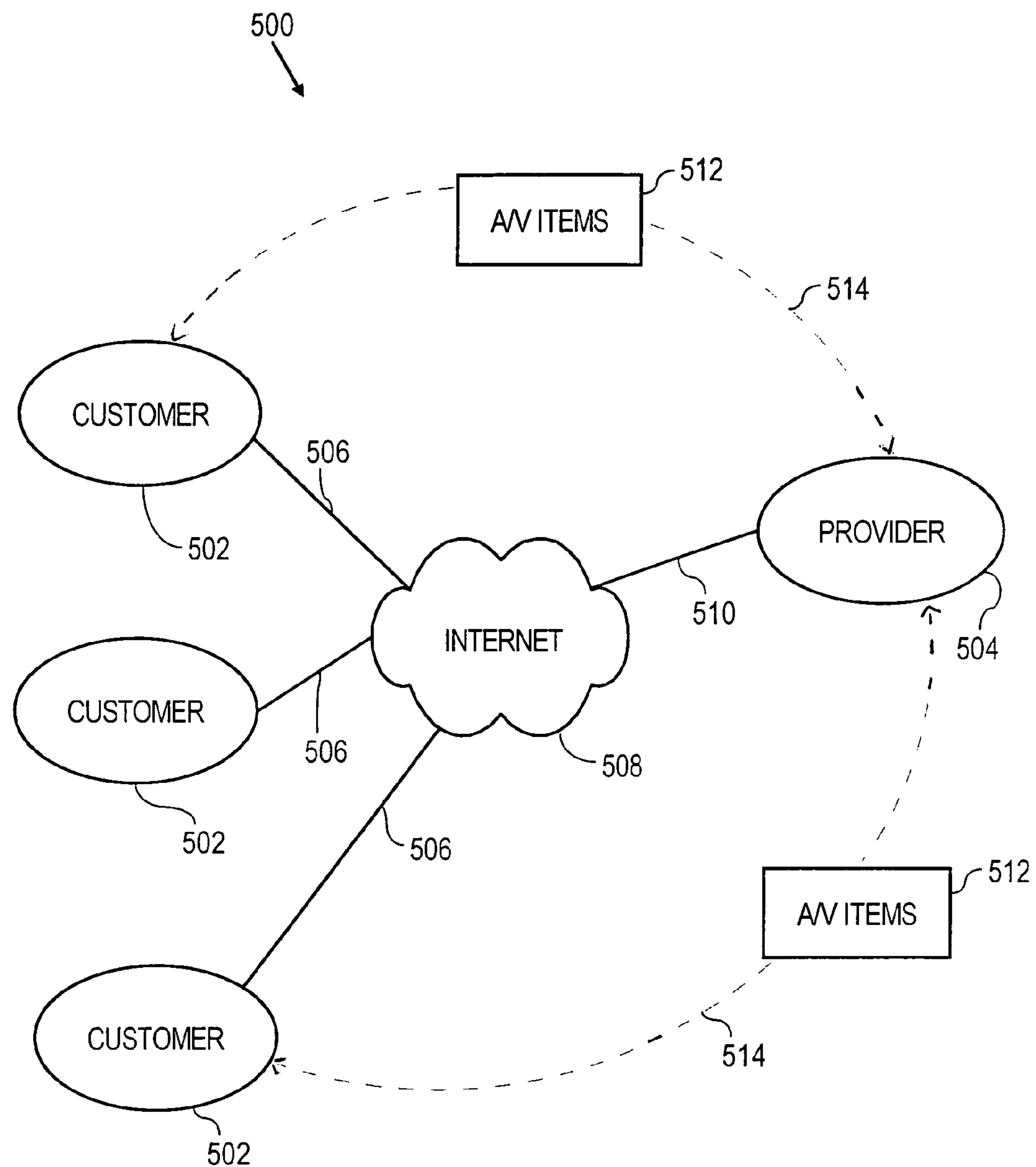
FIG. 5 is a diagram depicting an approach for renting audio/video items to customers over the Internet according to an embodiment.

The approach for renting items described herein is now described in the context of renting to customers audio/video (A/V) items, such as movies, games and music, stored on various media. FIG. 5 is a diagram 500 that depicts a set of customers 502 that desire to rent A/V items from a provider 504. Customers 502 communicate with provider 504 over links 506, the global packet-switched network referred to as the "Internet," and a link 510.

Links 506 and 510 may be any medium for transferring data between customers 502 and the Internet 508 and between the Internet 508 and provider 504, respectively, and the invention is not limited to any particular medium. In the present example, links 506 and 510 may be connections provided by one or more Internet Service Providers (ISPs) and customers 502 are configured with generic Internet web browsers. Links 506 and 510 may be secure or unsecured depending upon the requirements of a particular application.

In accordance with an embodiment, customers 502 enter into a rental agreement with provider 504 to rent audio/video (A/V) items 512 from provider 504 according to the "Max Out" and/or "Max Turns" approaches described herein. The invention is not limited to any particular approach for entering into the rental agreement. For example, customers 502 and provider 504 may enter into a rental agreement by mail, telephone or over the Internet, by customers 502 logging into a web site associated with provider 504.

Customers 502 create and provide item selection criteria to provider 504 over links 506 and 510 and the Internet 508. The invention is not limited to any particular approach for specifying and providing item selection criteria to provider 504. For example, according to one embodiment, customers 502 provide item selection criteria to provider 504 in one or more data files. According to another embodiment, customers 502 log onto a web site of provider 504 and use a graphical user interfaced (GUI) to specify attributes of the movies and music that customers desire to rent from provider 504.

The item selection attributes may include any attributes that describe, at least in part, movies, games or music that customers 502 desire to rent. For movies, example attributes include, without limitation, title, category, director name, actor name and year of release. For games, example attributes include, without limitation, title and category. For music, example attributes include, without limitation, title, category, artist/group name and year of release. Customers 502 may identify specific movies or music by the item selection criteria, or may provide various attributes and allow provider 504 to automatically select particular movies and music that satisfy the attributes specified. For example, customers 502 may specify item selection criteria that include horror movies released in 1999 and let provider 504 automatically select horror movies that were release in 1999. As another example, customers 502 may specify item selection criteria that include adventure movies starring Harrison Ford. Customers 502 may also specify an order or priority for the specified item selection criteria. For example, customers 502 may specify specific movie titles and the order in which they want to receive them. As another example, customers 502 may specify that they want to receive a particular number of movies of different types.

Once customers 502 and provider 504 have entered into a rental agreement and customers 502 have provided item selection criteria to provider 504, then A/V items 512 are rented to customers 502 over delivery channels 514 in accordance with the terms of the rental agreement. Specifically, according to the "Max Out" approach described herein, an initial set of A/V items 512, such as movies, games and music, are delivered to customers 502 over delivery channels 514 according to the terms of the rental agreement. Subsequent A/V items 512 are delivered whenever the specified item delivery criteria are satisfied. For example, additional A/V items 512 may be delivered upon the return of one or more A/V items 512 to provider, a request from customers 502, the arrival of a particular date, e.g., a specific day of the month, or the expiration of a specified period of time, e.g., fifteen days.

In accordance with the "Max Out" approach described herein, once the maximum number of A/V items 512 have been rented to a particular customer 502, then no additional A/V items 512 are rented until one or more rented A/V items 512 are returned to provider 504, or unless a surcharge is applied to the particular customer 502. Alternatively, the rental agreement between the particular customer 502 and provider 504 may be modified to increase the maximum number of A/V items 512 that may be rented simultaneously to the particular customer 502.

The rental agreement between customers 502 and provider 504 may also specify a maximum number of turns in combination with the "Max Out" approach. In this situation, a maximum number of turns restricts how quickly customers 502 may refresh their A/V item 512 inventories. For example, suppose that a particular customer 502 agrees with provider 504 to rent up to four movies with a maximum of four turns per month. Under this agreement, the particular customer 502 may maintain a personal inventory of up to four movies and rent four new movies per month. Thus, the particular customer 502 can completely "replace" his personal inventory once per month. If the particular customer 502 agreed to a maximum of up to eight turns per month, then the particular customer 502 would be able to completely replace his personal inventory twice per month.

Provider 504 is illustrated as a single entity for purposes of explanation only. Provider 504 may be centralized or distributed depending upon the requirements of a particular application. For example, provider 504 may be a central warehouse from which all A/V items 512 are provided. Alternatively, provider 504 may be implemented by a network of distributed warehouses.

Figure 6:
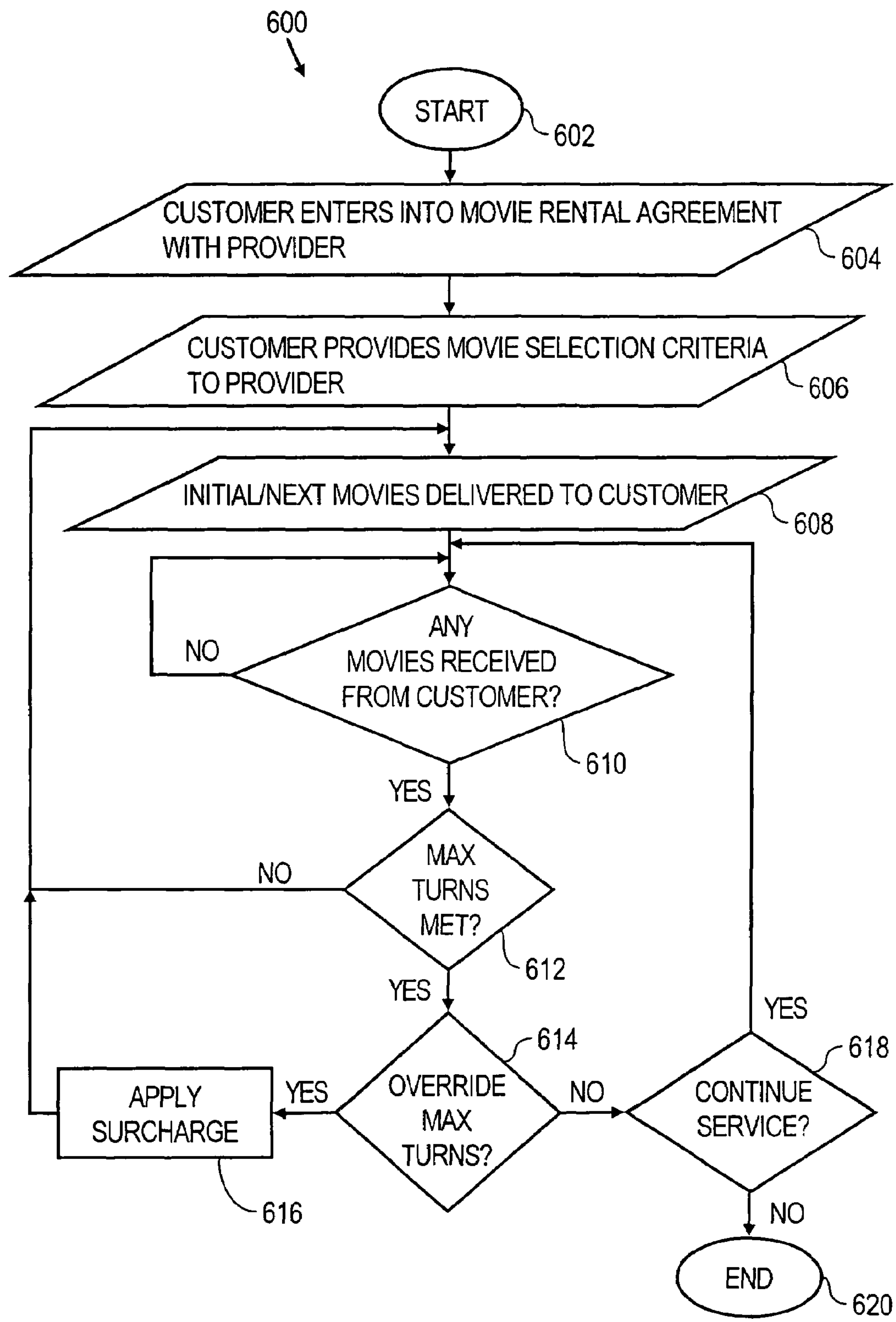
FIG. 6 is a flow diagram illustrating an approach for renting audio/video items to customers over the Internet using both "Max Out" and "Max Turns" according to an embodiment.

FIG. 6 is a flow diagram that illustrates an approach for renting A/V items 512, e.g., movies, to customers over a communications network such as the Internet using both "Max Out" and "Max Turns" according to an embodiment. Referring also to FIG. 6, after starting in step 602, in step 604, a customer 502 enters into a rental agreement with provider 504. In the present example, customer 502 uses a generic web browser to access an Internet web site associated with provider 504 and enter into a rental agreement that specifies that customer 502 may maintain a personal inventory of four movies ("Max Out" of four) and receive up to four new movies per month ("Max Turns" of four). Furthermore, the rental agreement specifies that new movies will be delivered upon return of a rented movie from customer 502, i.e., the delivery criteria is a return of a movie by the customer.

In step 606, customer 502 creates and provides movie selection criteria to provider 504 that indicates movies that customer 502 desires to rent. For example, the movie selection criteria may specify particular movie titles that customer 502 desires to rent. The movie selection criteria may also specify an order or priority in which customer 502 wishes to rent the movies. Instead of identifying particular movie titles, the movie selection criteria may specify movie preferences for customer 502, e.g., types of movies, directors, actors, or any other movie preferences or attributes. In this situation, provider 504 automatically selects particular titles that satisfy the movie selection criteria. For example, the movie selection criteria may specify a preference for action movies starring a particular actor, with a preference for "new release" movies. Provider 504 attempt to provide movies to customer 502 that best satisfy the preferences indicated by the movie selection criteria.

In step 608, one or more initial movies 512 are delivered to customer 502 over delivery channel 514. The one or more initial movies 512 may be delivered to customer 502 via mail, courier, delivery agent or any other suitable means negotiated between customer 502 and provider and the invention is not limited to any particular type of delivery mechanism. For purposes of explanation only, is presumed in the present example that movies are mailed between customer 502 and provider 504.

The one or more initial movies 512 establish the personal movie inventory of customer 502. Customer 502 may choose to receive any number of movies up to the "Max Out" limit of four movies. Typically, customer 502 will choose to initially receive four movies in the initial delivery.

Once the one or more initial movies 512 have been mailed to customer 502, then in step 610, a determination is made whether any movies 512 have been returned by customer 502 to trigger another movie delivery. In the present example, the delivery of additional movies is triggered by the receipt, e.g., via mail, of one or more movies from customer 502. In the situation where customer 502 elects to not receive the maximum number of movies 512 in the initial delivery, then the delivery of additional movies 512 may also be triggered by a request from customer 502 for additional movies 512. For example, customer 502 may notify provider 504 via telephone, email or by accessing the web site associated with provider 504.

If, in step 610, a determination is made that one or more movies 512 were received from customer 502, then in step 612, a determination is made whether the maximum number of turns ("Max Turns") limit has been reached for the current cycle. In the present example, a determination is made whether four or more movies have been mailed in the current month. If not, then control returns to step 608, where one or more additional movies 512 are mailed to customer 502 via delivery channel 514 up to the "Max Out" limit of four.

If, in step 612, a determination is made that the "Max Turns" limit has been met for the current cycle, i.e., in the present example, four movies 512 have been mailed to customer 502 in the current month, then in step 614 a determination is made whether to override the current "Max Turns" limit. If so, then in step 616, a surcharge is applied to customer 502 and control returns to step 608 where the additional movies 514 are mailed to customer 502. If not, then in step 618, a determination is made whether to continue the subscription service. If so, then no additional movies are mailed to customer 502 during the current cycle, e.g., the current month, and the control returns to step 610. If, in step 618, a determination is made that service is not to be continued, then the process is complete in step 620.

In some situations, customer 502 may desire to increase or decrease the size of customer's 502 personal movie inventory by changing the current "Max Out" limit. According to one embodiment, customer 502 notifies provider 504, e.g., by telephone, mail, email or by accessing the web site associated with provider 504, that customer 502 wishes to change the "Max Out" limit. The movie rental agreement between customer 502 and provider 504 is then modified to reflect the change of the "Max Out" limit. In the situation where the "Max Out" limit is increased, then additional movies 512 may be immediately mailed to customer 502.

VI. Inventory Management

The approach described herein for renting items to customers provides superior inventory management to prior approaches. Specifically, the use of item selection criteria provides for efficient inventory management by allowing the greatest number of items to be rented at any given time. Moreover, the greatest number of customers are provided with their most preferred items. For example, customers may specify priorities for the items indicated by the item selection criteria. Thus, if a particular customer's first choice is not available, or already rented, then the item having the next highest priority can be rented to the particular customer. According to one embodiment, customers may indicate items that are not yet available for rent. Then, the items are delivered to customers when they become available.

For example, referring again to FIG. 5, suppose that a particular customer 502 desires to rent an as-yet-unreleased movie entitled "ABC." The particular customer 502 indicates this movie to provider 504 by the item selection criteria. Since the movie ABC is not yet available, it cannot be delivered to the particular customer 502. However, when the movie ABC does become available, it can be shipped immediately to the particular customer 502, as well as other customers 502 who may have also requested the movie. This allows provider 504 to maximize the number of items rented while ensuring that customers 502 are able to rent the highest priority items that they requested.

According to another embodiment, as yet unknown items may also be rented by specifying attributes of the unknown items. For example, the particular customer 502 may request to rent the next new movie of a particular director, for which the exact name is unknown to the particular customer. As another example, the particular customer 502 may request to rent the next album of a particular group that is currently in process and does not yet have a title.

VII. Item Recommendation

A. Overview

In some situations, it is desirable to know how a user would rate an item. For example, in the context of recommending items to users, it is useful to know how a user would rate an item, so that a decision can be made to either recommend or not recommend the item to the user. A recommendation is more valuable to the user if it is likely that the user would rate the item highly because the user is more likely to be happy with the recommendation. An approach is provided for estimating how a user would rate an item. The approach generally involves estimating how a user would rate an item based upon similarities between items and similarities of ratings given to items by both the user and one or more other users. The approach is applicable to any type of item, for example rental items such as movies and games, and the invention is not limited to any particular type of item. The approach is applicable to a wide variety of contexts and may be used, for example in a recommendation engine to recommend items to users.

FIG. 7 is a flow diagram 700 that depicts an approach for estimating how a user would rate a particular item according to an embodiment of the invention. In step 702, one or more items from a plurality of items are identified that have ratings similar to the particular item. In step 704, one or more other users are identified that have given ratings to the one or more other items that are substantially similar to ratings given by the user to the one or more other items, and have also rated the particular item. In step 706, an estimation of how the user would rate the particular item is generated based upon ratings given by the one or more other users for the particular item. Each of these steps is described in more detail hereinafter.

Figure 8:
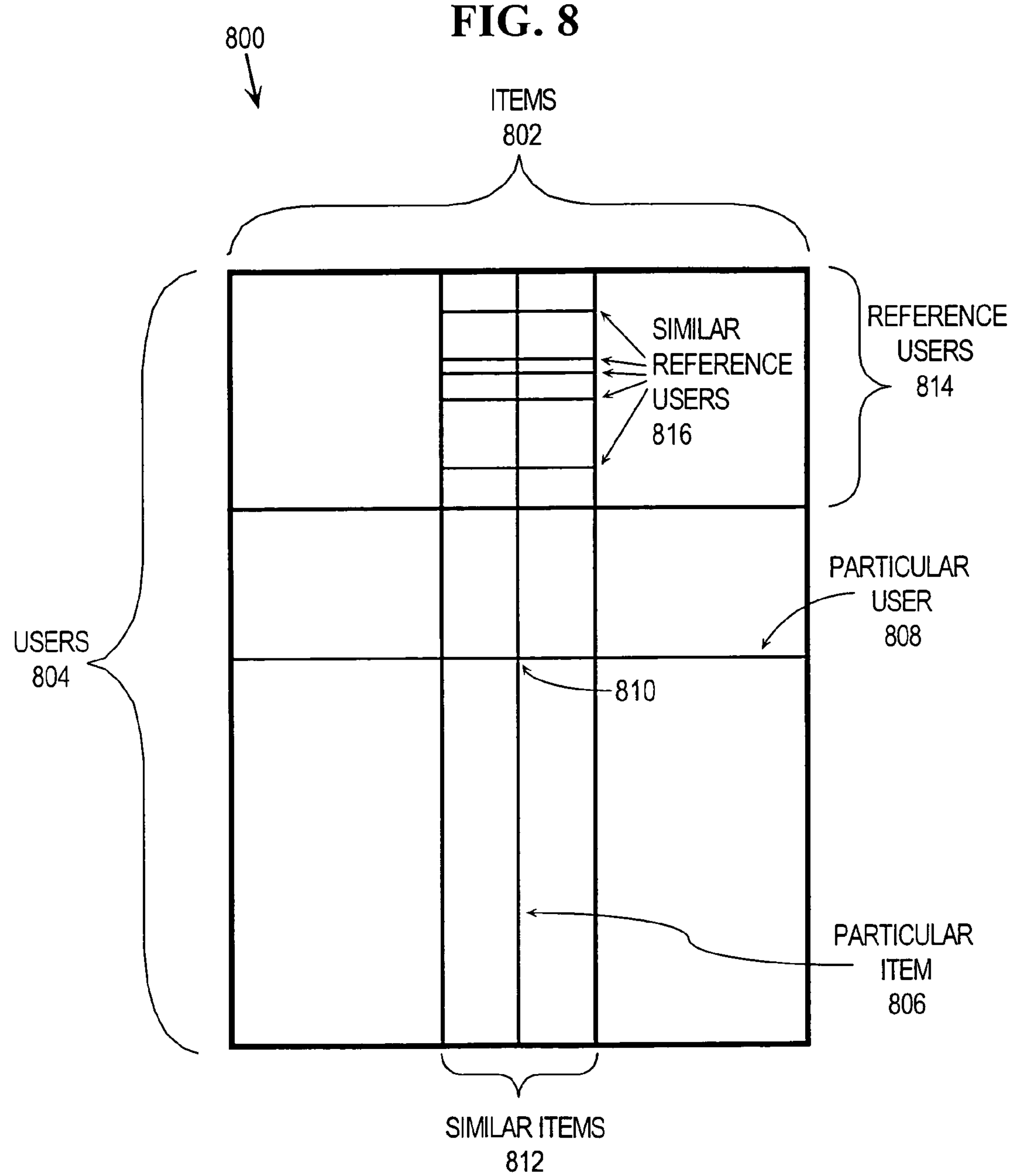
FIG. 8 is a block diagram that depicts users' ratings of items arranged in an array.

FIG. 8 is a block diagram that depicts users' ratings of items arranged in an array 800. Array 800 includes columns of items 802 and rows of users 804. Each cell may be empty or contain data indicating that the user has not provided a rating for the item. For example, a specified value, such as a null value or other value, may be used to indicate that a user has not provided a rating for an item. Alternatively, each cell may contain data that represents a user rating of an item. Different types of data and values may be used to indicate a user rating of an item, depending upon the requirements of a particular application, and the invention is not limited to any particular data types or values. For example, ratings may be represented by numerical data, e.g., in a range of 1 to 5 that corresponds to a 5-star rating scale or binary data that corresponds to a favorable or unfavorable rating. Embodiments of the invention are described herein in the context of users' ratings in array 800 for explanation purposes only and the invention is not limited to users' ratings being maintained in any particular format or data structure. Furthermore, the relative size of the items 802 and users 804 dimensions depicted in FIG. 8 is not meant to imply that there must be more users 804 than items 802. Embodiments of the invention are described herein in the context of generating an estimated rating for a particular item 806, from items 802, and a particular user 808, from users 804. The estimated rating for the particular item 806 and particular user 808 is indicated in FIG. 8 by reference numeral 810.

B. Identifying Other Items that have Ratings Similar to the Particular Item

A set of similar items 812 that have ratings similar to the particular item 806 is identified. Similar items 812 are depicted in FIG. 8 as being located adjacent to the particular item 806 in array 800 for explanation purposes only. Similar items 812 may include any of items 802. A variety of techniques may be used to determine similar items 812, depending upon the requirements of a particular application, and the invention is not limited to any particular technique.

According to one embodiment of the invention, similar items 812 are items from items 802 that satisfy item similarity criteria with respect to particular item 806. Thus, other items that satisfy the item similarity criteria with respect to the particular item are considered to be similar to the particular item. Similarity is not necessarily symmetrical. Thus, although an item A may be considered similar to particular item 806 and therefore included in similar items 812 for particular item 806, particular item 806 may, or may not be, sufficiently similar to item A to be considered similar to item A and included in a set of similar items for item A. The number of items in similar items 812 may be limited to a specified number to reduce the amount of computational resources and time required to generate an estimated rating for particular item 806. For example, the specified number of items in similar items 812 may represent the first specified number of items that satisfied the item similarity criteria for particular item 806, or may represent the specified number of items that satisfied the item similarity criteria for particular item 806 with similarity above some specified level or threshold.

The item similarity criteria may include a wide variety of criteria, depending upon the requirements of a particular implementation, and the invention is not limited to any particular item similarity criteria. One example of item similarity criteria is a statistical correlation threshold. Thus, two items that satisfy the statistical correlation threshold are considered to be similar to each other. A wide variety of statistical measures may be used for this purpose, depending upon the requirements of a particular implementation, and the invention is not limited to any particular statistical measure of similarity. For example, a Pearson Correlation Coefficient may be used as the statistical measure of similarity as shown in equation (1) below:

$$r = \frac{n\sum X_i Y_i - \sum X_i \sum Y_i}{\sqrt{\left[n\sum X_i^2 - \left(\sum X_i\right)^2\right]\left[n\sum Y_i^2 - \left(\sum Y_i\right)^2\right]}} \quad (1)$$

where $X_i$ are the ratings for one item or user and $Y_i$ are the ratings for the other item or user, and the summation is applied across all co-ratings. As another example, a vector cosine distance may be used as the statistical measure of similarity as shown in equation (2) below:

$$r = \frac{\sum X_i Y_i}{\sqrt{\sum X_i^2}\sqrt{\sum Y_i^2}} \quad (2)$$

where $X_i$ and $Y_i$ are the ratings for one item or user.

Table I below contains example user ratings for items X and Y, the product of the user ratings for X and Y, the square of the user ratings for X and Y and the summations of these values:+

TABLE I

| | X | Y | X · Y | X**2 | Y**2 |
|---|---|---|---|---|---|
| | 1 | 2 | 2 | 1 | 4 |
| | 4 | | | | |
| | 4 | 1 | 4 | 16 | 1 |
| | 5 | 4 | 20 | 25 | 16 |
| | 3 | 3 | 9 | 9 | 9 |
| | 3 | | | | |
| | 5 | 4 | 20 | 25 | 16 |
| | | 1 | | | |
| | 4 | 4 | 16 | 16 | 16 |
| | 4 | 5 | 20 | 16 | 25 |
| Summations | 26 | 23 | 91 | 108 | 87 |

Note that the summations of the X and Y columns include only ratings for users who rated both item X and item Y.

The Pearson Correlation Coefficient is $$\frac{7\times 91 - 26\times 23}{\sqrt{[7\times 108 - 26^2][7\times 87 - 23^2]}} = 0.4875$$

and the vector cosine distance is $\frac{91}{\sqrt{108}\cdot\sqrt{87}} = 0.938793$ Another example of the item similarity criteria is a specified number of co-ratings between items. A co-rating exists for two items when a user rates both items. Thus, the item similarity criteria may specify a minimum number of co-ratings that must be shared between two items for the two items to be considered similar items. Yet another example of the item similarity criteria is a specified fraction of co-ratings between items divided by the number of ratings of either item. Thus, the item similarity criteria may specify a minimum fraction of co-ratings between two items divided by the number of ratings of either item that must be satisfied for the two items to be considered similar items. If the total population of users is U, the number of users who rated item A is $R_a$, the number of users who rated item B is $R_b$, and if the probability of a user rating item A is independent of the probability of the user rating item B, then the expected number of co-ratings $E(R_{ab})$ is given by:

$$E(R_{ab}) = U\cdot\frac{R_a}{U}\cdot\frac{R_b}{U}$$

If the actual number of co-raters of both Item A and Item B $R_{ab}$ is much larger than $E(R_{ab})$, it is likely that Item A and Item B are related in some way. On the other hand, if $R_{ab}$ is much smaller than $E(R_{ab})$, it is likely that Item A and Item B are dissimilar in a way such that raters of Item A are unlikely to encounter Item B, or unlikely to have an opinion about Item B and so are less likely to rate Item B (and vice-versa). Either of these pieces of information may be used as additional similarity criteria. Note: if one of Item A or Item B is newer than the other (in other words, did not exist at the time the other Item was popular or well-known), then it is very likely that the total number of co-ratings of the Items will be much smaller than would be expected by the basic formula above.

As a variation, the pool of ratings may be subdivided into slices by time—for example, months—and the co-raters fraction calculation described above may be applied to in each successive (month) slice.

In some situations, using the Pearson Correlation Coefficient to measure similarity between two items can make two dissimilar items appear similar. This occurs where the underlying rating distributions of two items make the co-ratings of the two items appear to be correlated. For example, two items may have a high number of high ratings. Although the items are unrelated, a grouping of rating pairs in both items among the co-raters, i.e., users who rated both items, makes them appear related.

According to one embodiment of the invention, the ratings distributions of the two items are "factored out." This is performed by taking the percentage of each rating for each item, and multiplying it out in a two-dimensional array to obtain expected percentages for every possible pair of ratings (r1, r2) for the two items. Multiplying each of the array values by the total number of co-raters produces the expected count of co-raters for each rating pair, if the items are unrelated. The actual counts of co-ratings in each of the array cells are compared to see if they are more or less than expected. Higher than expected values in areas corresponding to similarity, e.g. a user that rated both items high or both item slow, indicates that the items are similar. Higher than expected co-rater counts in areas where a user liked one item and disliked another indicates that the items are not positively related. This use of the underlying ratings distribution for all raters provides a better understanding of values for co-raters.

The descriptions above have identified several different similarity criteria, which may be combined to determine overall similarity. For example, in one embodiment, the Pearson Correlation Coefficient is required to be greater than a threshold (e.g. 0.3), and also the fraction of co-raters $R_{ab}$ must be at least some fraction (e.g. one half) the expected number of co-raters E(Rab), and the absolute number of co-raters must be at least some minimum number (e.g. 200).

The methods described above show how to calculate the similarity between two items in order to find a set of similar items. The exact same methods may be applied in order to calculate the similarity between two users in order to find a set of similar users.

In some circumstances, there may be insufficient rating data to determine a set of items similar to the particular item. For example, if the particular item is new, there may be very little data allowing correlations to be calculated. In this case, other semantic information may be used to help determine similar items.

In one embodiment, items are additionally classified by semantic feature values. For example, if the items are movies, the semantic features might be genre (or category), director, lead actors/actresses, other actors/actresses, etc., and the feature values are the genre, director, or actor names. In a music domain, the features might be styles, soloists, musicians, and lyricists. Each type of feature is given an importance score, which may be positive, negative, or zero, and two items may be compared by counting the number of feature matches and summing their importance scores. For example, if a movie director has an importance score of 3, and a lead actor has an importance score of 1, then a pair of movies sharing one director and one lead actor would score a similarity of 4, while a different pair of movies sharing two lead actors would have a similarity score of 2. The absence of matches may be accorded a negative score (for example, the absence of matching directors might score the pairing −0.1 points). The set of similar items is the specified number of items whose similarity score with the particular item is largest, or the set of items whose similarity score is above a specified threshold.

In another embodiment, tools may be provided for domain experts to specify item similarity by non-machine-implemented means. Once additional ratings data becomes available, the similar items specified by domain experts may be supplemented or discarded.

C. Identifying Other Users that have Given Ratings for the Other Items Similar to the Particular User Once similar items 812 have been determined, one or more users from users 804 that have given ratings to similar items 812 that are similar to ratings given by the particular user 808 to similar items 812 are identified. All of users 804 may be evaluated for this purpose. There may be a significant and unacceptable computational cost, however, in evaluating all of users 804 in some applications where the number of users 804 is large. Furthermore, some users may be less useful than others because they have very little ratings data or have ratings data with poor statistical characteristics, as described in more detail hereinafter.

According to one embodiment of the invention, a subset of users 804, referred to herein as reference users 814, is determined based upon specified user selection criteria. Reference users 814 are users from all users 804 that satisfy the specified user selection criteria. A wide variety of user selection criteria may be used, depending upon the requirements of a particular application, and the invention is not limited to any particular user selection criteria. According to one embodiment of the invention, the user selection criteria include a minimum number of ratings. Thus, users from users 804 that do not have at least the minimum number of ratings are not included in reference users 814. The user selection criteria may include a maximum number of ratings. Thus, users from users 804 that have more than the maximum number of ratings are not included in reference users 814.

According to another embodiment of the invention, the user selection criteria specify an average rating range. Thus, users from users 804 with an average rating that is outside the specified range are not included in reference users 814. For example, suppose that ratings are provided on a numerical scale from one to five. Suppose further that the user selection criteria specify that the acceptable average rating range is two to four. In this situation, users 804 with an average rating that is less than two or greater than four are not included in reference users 814.

According to another embodiment of the invention, the user selection criteria specify that user ratings must conform to within a specified tolerance of a Normal distribution. Thus, users from users 804 with a rating distribution that does not approximate a Normal distribution within a specified tolerance are not included in reference users 814. For example, suppose that ratings are on a whole number numerical scale of one to five. A user that has more one ratings than two ratings, more two ratings than three ratings, more five ratings than four ratings, or more four ratings than three ratings is not included in reference users 814. The specified tolerance may vary, depending upon the requirements of a particular application. For example, some applications may use a specified tolerance that allows a user in reference users 814 to have a slightly greater number of two ratings than three ratings, and an equal number of two ratings and one ratings, but not more one ratings than three ratings.

According to another embodiment of the invention, the user selection criteria specify a range of acceptable standard deviations of user ratings. Thus, users from users 804 with a standard deviation of ratings that is not within the range of acceptable range of standard deviations of ratings are not included in reference users 814. For example, the user selection criteria might specify a standard deviation range of between 10% and 20%. Thus, a user having a standard deviation of ratings of less than 10% or 20% or greater is not included in reference users 814.

D. Generate Estimation of how the Particular User Would Rate the Particular Item Generating an estimation of how particular user 808 would rate particular item 806 generally involves identifying which users 804 have rated similar items 812 items similarly to particular user 808, and then generating the estimation based upon how those users 804 rated the particular item 806. In the situation where reference users 814 are identified from users 804 as described herein, then the approach generally involves identifying which reference users 814 have rated similar items 812 items similarly to particular user 808, and then generating the estimation based upon how those reference users 814 rated the particular item 806. Embodiments of generating an estimation of how particular user 808 would rate particular item 806 are described herein in the context of using reference users 814, although the invention is not limited to this context.

According to one embodiment of the invention, reference users' 814 ratings of similar items 812 are compared to the particular user's 808 ratings of similar items 812 to identify reference users 814 that are the most similar to particular user 808. In FIG. 8, reference users 814 that have provided ratings for similar items 812 that are most similar to the ratings for similar items 812 provided by particular user 808 are referred to hereinafter as similar reference users 816. In FIG. 8, the horizontal lines depicted across similar items 812 for the similar reference users 816 are provided for illustration purposes only and are not meant to imply that the similar reference users 816 have necessarily provided ratings for all similar items 812. Similarly, it is not necessary for the particular user 808 to have rated all similar items 812.

According to one embodiment of the invention, rating similarity criteria are used to identify the similar reference users 816. The rating similarity criteria may be similar to the item similarity criteria described herein. For example, the similar reference users 816 may be determined based upon determining statistical correlations between the ratings of similar items 812 provided by reference users 814 and the particular user 808 and then selecting the similar reference users 816 based upon the reference users 814 that best correlate to the particular user 808. The similarity between similar items 812 and the particular item 806 may also be considered in identifying the similar reference users 816. More specifically, ratings of similar items 812 that are more similar to the particular item 806 may be given more weight in determining the similar reference users 816 from reference users 814.

Once the similar reference users 816 are identified, the estimation of how the particular user 808 would rate the particular item 806 is generated based upon the ratings of the particular item 806 made by the similar reference users 816. The degree of similarity between the similar reference users 816 and the particular user 808 may vary based upon a variety of factors including, for example, the number of similar items 812 that both the particular user 808 and the similar reference users 816 have rated and how the particular user 808 and the similar reference users 816 rated the similar items 812. The estimation may be generated in different ways, depending upon the similarity between the ratings of similar items 812 provided by the similar reference users 816 and the particular user 808. For example, there may be situations where the ratings provided by the one or more similar reference users 816 for similar items 812 are identical to the ratings provided by the particular user 808 for the same similar items 812. This may occur, for example, where the number of similar items 812 rated by both the similar reference users 816 and the particular user 808 is relatively small. In this situation, the estimated rating of the particular item 806 by the particular user 808 may be the average rating made by the one or more similar reference users 816 for the particular item 806.

In situations where the ratings for similar items 812 by the similar reference users 816 and the particular user 808 are not identical, then the estimated rating of the particular item 806 by the particular user 808 may be the weighted linear sum of the ratings made by the one or more similar reference users 816 for the particular item 806. The weighting applied varies based upon the similarity between each similar reference users 816 and the particular user 808. According to one embodiment of the invention, the weighted linear sum of the ratings for particular item 806 is the sum of the products of the weights and the similar reference users' 816 ratings of particular item 806, divided by the sum of the weights. Thus, the ratings of particular item 806 provided by the similar reference users 816 that are most similar to the particular user 808 are given more weight than the ratings of particular item 806 provided by the similar reference users 816 that are less similar to the particular user 808. For example, suppose that the similar reference users 816 include users A and B that are determined to have similarities to the particular user 808 of 0.8 and 0.5 (on a scale of 0 to 1), respectively. Furthermore, users A and B have given ratings for particular item 806 of 5 and 3 (on a scale of 1 to 5), respectively. The average rating of particular item 806 by users A and B is 4 ((5+3)/2). The weighted linear sum of the ratings for particular item 806 by users A and B is 4.23 ((5*0.8+3*0.5)/1.3). The weighted linear sum of the ratings is greater than the average of the ratings in this situation because the higher rating of user A is given greater weight than the lower weighting of user B, by virtue of the relatively greater similarity between user A and the particular user 808 than between user B and the particular user 808.

Various confidence metrics may be calculated that indicate a confidence level in an estimated rating of particular item 806 by the particular user 808. According to one embodiment of the invention, a confidence metric is calculated based upon the disparity or spread between estimated ratings, where each estimated rating is based upon a different one of the similar reference users 816. The standard deviation of the estimated ratings may be used for this purpose. The calculation of confidence based upon the disparity between estimated ratings may weight these estimated ratings based on the strength of the similarity between the reference user 816 and the particular user 808. A confidence metric may also be made based upon similarities between the particular user 808 and each similar reference user 816 that is used to estimate a rating. The calculation of confidence may also take into account the absolute strength of the similarity between the reference users 816 used to generate the prediction and the particular user 808.

There may be situations where there is an insufficient (or zero) number of similar reference users 816. In these situations, a weighted average of all reference users 814, who each share at least a rating of one of similar items 812 with the particular user 808 and who have each rated the particular item 806, may be used to generate an estimation of how the particular user 808 would rate the particular item 806. According to one embodiment of the invention, the weightings are applied based upon the similarity of each reference user 814 to the particular user 808. Confidence metrics may also be applied to generating an estimation of how the particular user 808 would rate the particular item 806 based upon all reference users 814 used to generate the estimate.

In situations where there is an insufficient (or zero) number of reference users 814, which may also occur if the particular user 808 has an insufficient (or zero) number of ratings, an average rating of the particular item 806 by all reference users 814 who have rated the particular item 806 may be used as an estimate of how the particular user 808 would rate the particular item 806. Alternatively, an average rating of all users 804 who have rated the particular item 806 may be used as an estimate of how the particular user 808 would rate the particular item 806. In these situations, a weighted average of all reference users 814, who each share at least a rating of one of similar items 812 with the particular user 808 and who have each rated the particular item 806 may be used.

E. Recommendation Architecture

Figure 9:
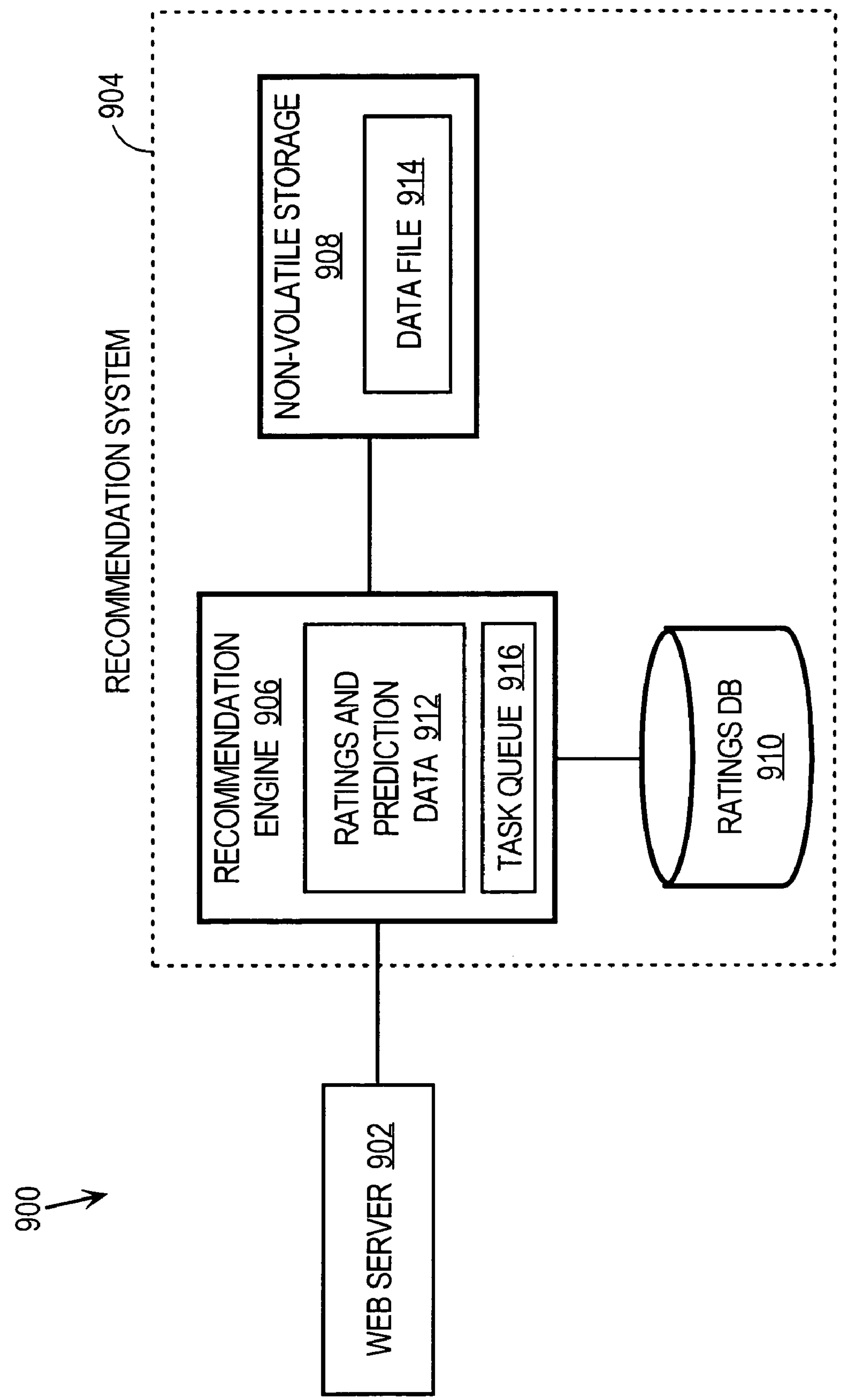
FIG. 9 is a block diagram that depicts an arrangement for recommending items according to an embodiment of the invention.

FIG. 9 is a block diagram that depicts an arrangement 900 for recommending items according to an embodiment of the invention. Arrangement 900 includes a Web server 902 communicatively coupled to a recommendation system 904. As described in more detail hereinafter, recommendation system 904 is configured to process ratings data using prioritized tasks to provide improved availability and accuracy of item recommendations. Recommendation system 904 includes a recommendation engine 906, a non-volatile storage 908 and a ratings database (DB) 910. Recommendation engine 906 may be implemented by any mechanism or any combination of hardware and software for performing the functions described herein. For purposes of explanation only, recommendation engine 906 is described in the context of a software process executing in a volatile memory. Non-volatile storage 908 may be implemented by any type of non-volatile storage mechanism and the invention is not limited to any particular mechanism. Example implementations include, without limitation, non-volatile memory and disc storage. Ratings DB 910 may be implemented by any database management mechanism and the invention is not limited to any particular implementation.

Recommendation engine 906 maintains ratings and prediction data 912 that includes users' actual ratings and estimated ratings calculated according to the algorithms described herein, or otherwise. Ratings and prediction data 912 may be maintained in a volatile memory, such as a random access memory (RAM), to reduce access times. According to one embodiment of the invention, ratings and prediction data 912 is maintained in a RAM array and is addressed using 64 bit addressing as provided by high-end computing architectures. The array is laid out such that two bytes are used for each cell, containing a rating value, an estimated rating value, a confidence value, and one or more flags indicating the presence and validity of the values. The RAM array may be considered as divided into a number of pages of perhaps 8,192 bytes each (which corresponds to the physical structure of current computers). The cells are laid out so that each user's ratings and estimated ratings span one or more pages for locality of access.

According to one embodiment of the invention, ratings and prediction data 912 is periodically saved to a data file 914 maintained on non-volatile storage 908. For example, low-level operating system primitives may be used to ensure that data written to the RAM array is also stored in data file 914 in a timely manner, so that recommendation engine 906 may be periodically shut down for maintenance and upgrade without losing any of the ratings and prediction data 912. Upon restarting the recommendation engine 906, data from data file 914 is mapped back (reloaded) into the RAM array, thereby restoring all the results of previous computations. In one embodiment of the invention, the memory mapping functionality of the Solaris operating system offered by Sun Microsystems, Inc., permits data file 914 to be sparsely populated with disc blocks, such that any pages in the RAM array that have no values do not occupy space on non-volatile storage 908. This provides considerable savings in hardware cost, since much of the RAM array will never contain ratings and prediction data. Ratings data is also stored in ratings DB 910, which allows data file 914 to be re-generated in the event of a failure of non-volatile storage. Ratings DB 910 may also store any data contained in the RAM array or data file 914 or any other data used by recommendation system 904, depending upon the requirements of a particular implementation.

The use of data file 914 also allows storage of more ratings and prediction data 912 than can be stored in the RAM array, given practical limitations in available RAM on computer architectures. According to one embodiment of the invention, the size of the RAM array is selected to be large enough to store ratings and prediction data 912 for at least reference users 814 and active users of recommendation system 904. As users' status changes from active to inactive, the physical pages of storage in the RAM array allocated to their rating and prediction data 912 may be reclaimed and reused for other users just becoming active.

Recommendation engine 906 is configured to perform a wide variety of tasks. These tasks may be prioritized in one or more task queues 916 to coordinate the activity of one or more processing threads. The one or more task queues may be stored in a volatile storage, such as RAM, or in non-volatile storage 908. The processing threads process tasks from the task queues 916 based upon priority and the processing of a task may create additional queue requests that are added to task queues 916. For example, recommendation engine 906 is configured to process requests for estimated ratings and requests for recommendations. An estimated rating for a particular item for a particular user may be requested in situations where, for example, a user is viewing data associated with the particular item, such as a review, on a graphical user interface (GUI), and it is desirable to display data that indicates an estimate of how the particular user would rate the particular item. A request for recommendations may be made, for example, in situations where a user has requested a list of recommended items from a Web application. When a request for an estimated rating a particular item for a particular user is received from Web server 902, recommendation engine determines whether the requested estimated rating has previously been calculated and stored in the RAM array. If so, then the estimated rating is immediately returned to Web server 902. If not, then a request is queued on the task queue with high priority to calculate the estimated rating (according to the algorithms described herein, or otherwise). If the compute threads complete the calculation of the estimated rating within some small threshold of time (for example, half a second) then the calculated estimated rating is returned. Otherwise, the recommendation engine 906 is configured to provide an average rating of the particular item as the estimated rating. When a request for a recommendation for a specific user is received from Web server 902, recommendation engine 906 identifies the set of items with the highest estimated ratings and highest confidence for that user and returns to Web server 902 data that identifies the set of items as recommendations. If there are no confident predictions, then no recommendations may be returned. Although embodiments of the invention are described herein and depicted in the figures in the context of a single Web server 902, this is provided for purposes of explanation only. Recommendation system 904 may be used with any number of Web servers and also other types of computing entities.

Recommendation engine 906 is also configured to receive and process rating data from Web server 902. Upon receipt of rating data, which may include a new or changed rating, recommendation engine 906 stores the rating in the RAM array using a simple address calculation and a simple memory write. The rating is also queued in a task queue 916 to be written to ratings DB 910. In addition, estimated ratings for items similar to the item associated with the received rating data may need to be updated to reflect the received rating data. Therefore, one or more tasks are added to task queues 916 to recalculate the estimated ratings for items for which the item associated with the received rating data is considered similar. According to one embodiment of the invention, these tasks are given high priority, since the updated estimated ratings may be required in a relatively short time, for example for a merchandising decision or a recommendation for a user who is presumably visiting the Website in order to provide the rating. Quality metrics may be calculated from comparisons of actual user ratings to estimated user ratings. For example, suppose that the estimated rating 810 has been determined for the particular item 806 and the particular user 808. Suppose further that this estimated rating 810 has been provided to Web server 902, displayed for the particular user 808, and the particular user 808 has provided an actual rating for the particular item 806. A quality metric may be calculated based upon a comparison of the actual rating to the estimated rating 810. This quality metric, along with other quality metrics, may be used to fine tune future estimated ratings.

Recommendation engine 906 is further configured to periodically, and continuously if necessary, recalculate ratings and prediction data 912. In particular, recommendation engine 906 is configured to recalculate the set of similar items for each item to reflect changes in ratings data and new ratings data. Changes in ratings data and new ratings data may be tracked and various thresholds and aging schemes used to prioritize recalculation of similar item sets. For example, items that have a relatively large amount of ratings data updated may be given priority over an item for which the calculated similar item set is simply old. It is beneficial to periodically recalculate the set of similar items for a particular item, even if no ratings data has changed for the particular item, since ratings data may have changed the set of items considered similar to the particular item.

Figure 10:
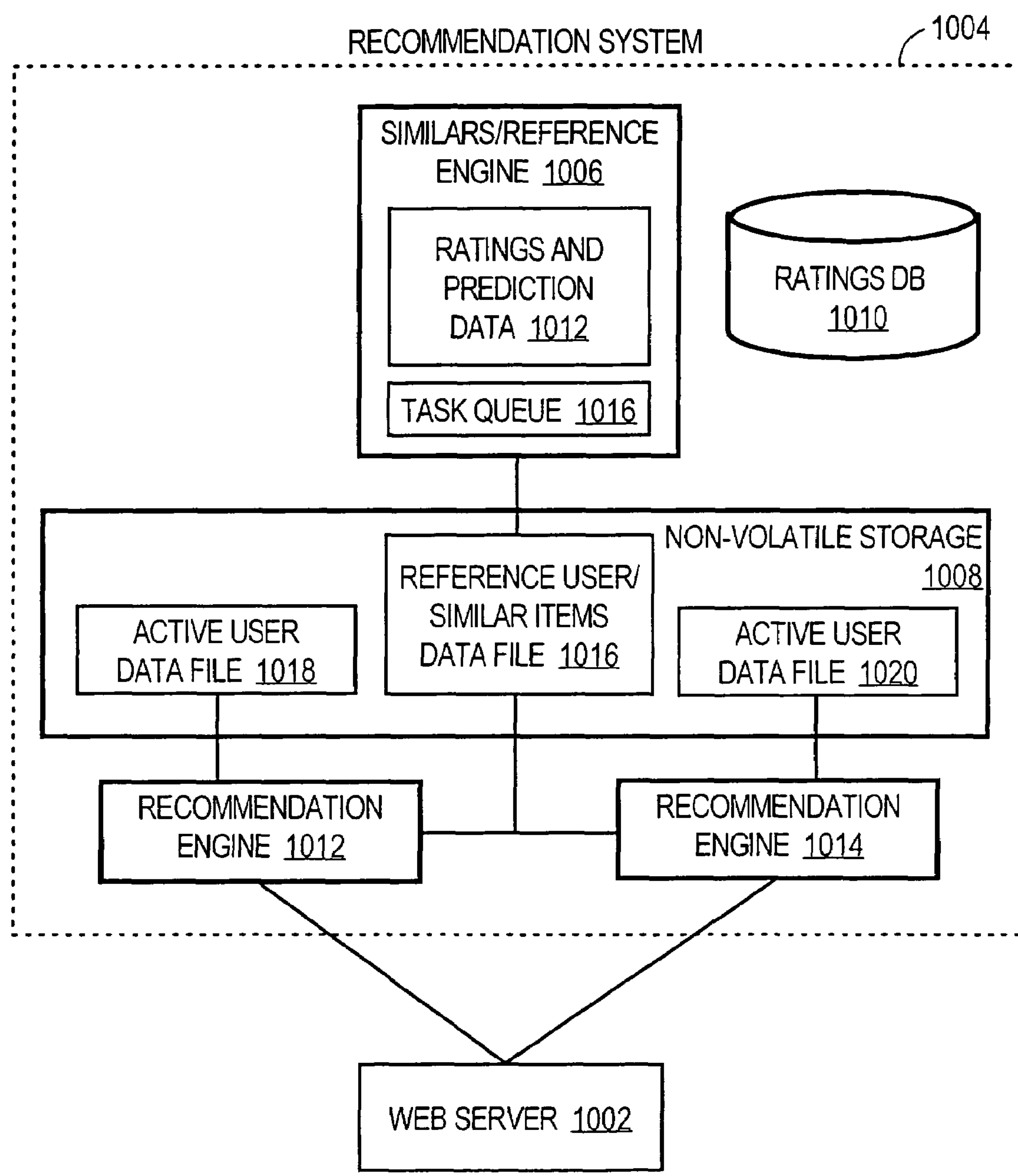
FIG. 10 is a block diagram that depicts another arrangement for recommending items according to an embodiment of the invention.

There may be situations where limitations in the power of the computing architecture used to implement recommendation system 904 make it difficult for recommendation system 904 to keep up with changes in ratings data. That is, the estimated ratings maintained by recommendation engine 906 may fall behind the updated ratings data. One consequence of this situation may be a loss in accuracy of estimated ratings. There may also be situations where limitations in the available size of non-volatile storage 908 may make maintaining data file 914 difficult. Accordingly, according to another embodiment of the invention, the approach is segmented into a series of separate recommendation engines and separate disc arrays allowing scaling to much higher capacities and load levels. FIG. 10 depicts an example embodiment of such an arrangement 1000.

Arrangement 1000 includes a Web server 1002 and a recommendation system 1004, configured in accordance with an embodiment of the invention. Recommendation system 1004 includes a similars/reference engine 1006, a non-volatile storage 1008, a ratings DB 1010 and recommendation engines 1012, 1014.

A single reference users/similar items data file 1016 is used to store the ratings for reference users 814. Reference users/similar items data file 1016 is maintained on non-volatile storage 1008 by similars/reference engine 1006, which maintains the set of reference users 814. Reference users 814 are chosen as described herein. If too many of users 804 qualify as reference users 814, then users 804 who have the most attractive rating patterns are chosen as reference users 814. Example criteria for choosing the reference users 814 include, without limitation, users with the most ratings, or the most ratings on otherwise unrated items, or other criteria that may be appropriate. New candidate reference users are loaded from ratings DB 1010 as they qualify, and existing reference users 814 may be displaced if any of the candidate reference users have more attractive parameters making them more suitable as references users 814 for making estimated ratings. Similars/reference engine 1006 is also configured to calculate sets of similar items 812 for each of items 802 on a continuous basis and store that data into reference users/similar items data file 1016.

Recommendation engines 1012, 1014 are configured to generate estimates of how users would rate items, as previously described herein. Recommendation engines 1012, 1014 have exclusive read/write access to active user data files 1018 and 1020, respectively. Active user data files 1018, 1020 store ratings and prediction data for the users assigned to recommendation engines 1012, 1014. Recommendation engines 1012, 1014 also have read-only access to reference users/similar items data file 1016. Read-only access is inexpensive in resources on the disc system and computer IO systems except when the recommendation engines 1012, 1014 are being started up. In an alternative embodiment, the reference users/similar items data file 1016 is periodically copied one or more times, and the resulting copy or copies are mapped by the recommendation engines 1012, 1024. Recommendation engines 1012, 1014 estimate how users would rate items as described herein, obtaining the reference rating values from reference users/similar items data file 1016 and storing estimated ratings in their private read-write active user data files 1018, 1020. The assignment of users to recommendation engines 1012, 1014 may be made using a variety of techniques, depending upon the requirements of a particular implementation, and the invention is not limited to any particular approach or assignment of users. Furthermore, the assignment of users to recommendation engines 1012, 1014 may be dynamic and change over time, depending, for example, on loading requirements.

Reference Users' 814 active profiles of ratings and predictions are stored in one of the active user data files 1018, 1020 and estimated ratings for reference users 814 are calculated by the appropriate recommendation engine 1012, 1014 and stored in the corresponding active user data files 1018, 1020. When a reference user 814 updates their ratings, those ratings are also stored in ratings DB 1010. Sometime later, similars/reference engine 1006 updates the shared copy of the ratings for that reference user 814 in reference user/similar items data file 1016. As long as the rate of change of ratings for reference users 814 is small compared to the total number of ratings for reference users 814, the quality of the similar items and estimated ratings calculated using the older data will not suffer measurably. Recommendation engines 1012, 1014 may store ratings and prediction data in one or more local RAM arrays and then periodically write the ratings and prediction data to active user data files 1018, 1020.

Task queues may be shared between the one or more engines, so that new work items may be triggered by one recommendation engine, but performed by a different engine if the task relates to data managed by the other engine.

Although embodiments of the invention have been described herein in the context of using a single similars/reference engine 1006, additional scaling may be provided by using multiple similars/reference engines that are each assigned responsibility for a portion of reference users 814. Since the determination of similar items 812 requires comparing columns of ratings for pairs of items across all reference users 814, it is appropriate to split reference users 814 by vertical segmentation by items, for example such that even/odd items (or other item segmentation) are split between different similars/reference engines. In this situation, each portion of the ratings data for each reference user 814 is available to each similars/reference engine. More specifically, each data file is owned by a single similars/reference engine that has read/write access for maintenance, and each data file is also made available on a read-only basis to all other similars/reference engine for access to the reference ratings data.

VIII. Implementation Mechanisms

The approach described herein for estimating how a user would rate a particular item is applicable to any type of items or content and is well suited for Internet-based rental applications for renting movies, music and games to customers. The invention may be implemented in hardware circuitry, in computer software, or a combination of hardware circuitry and computer software and is not limited to a particular hardware or software implementation. The invention is ideally suited for recommendation engine applications and may be implemented as a stand-alone mechanism, or integrated into a rental mechanism. For example, the approach is ideally suited for identifying rental items, such as movies, music and games, to recommend to users.

Figure 11:
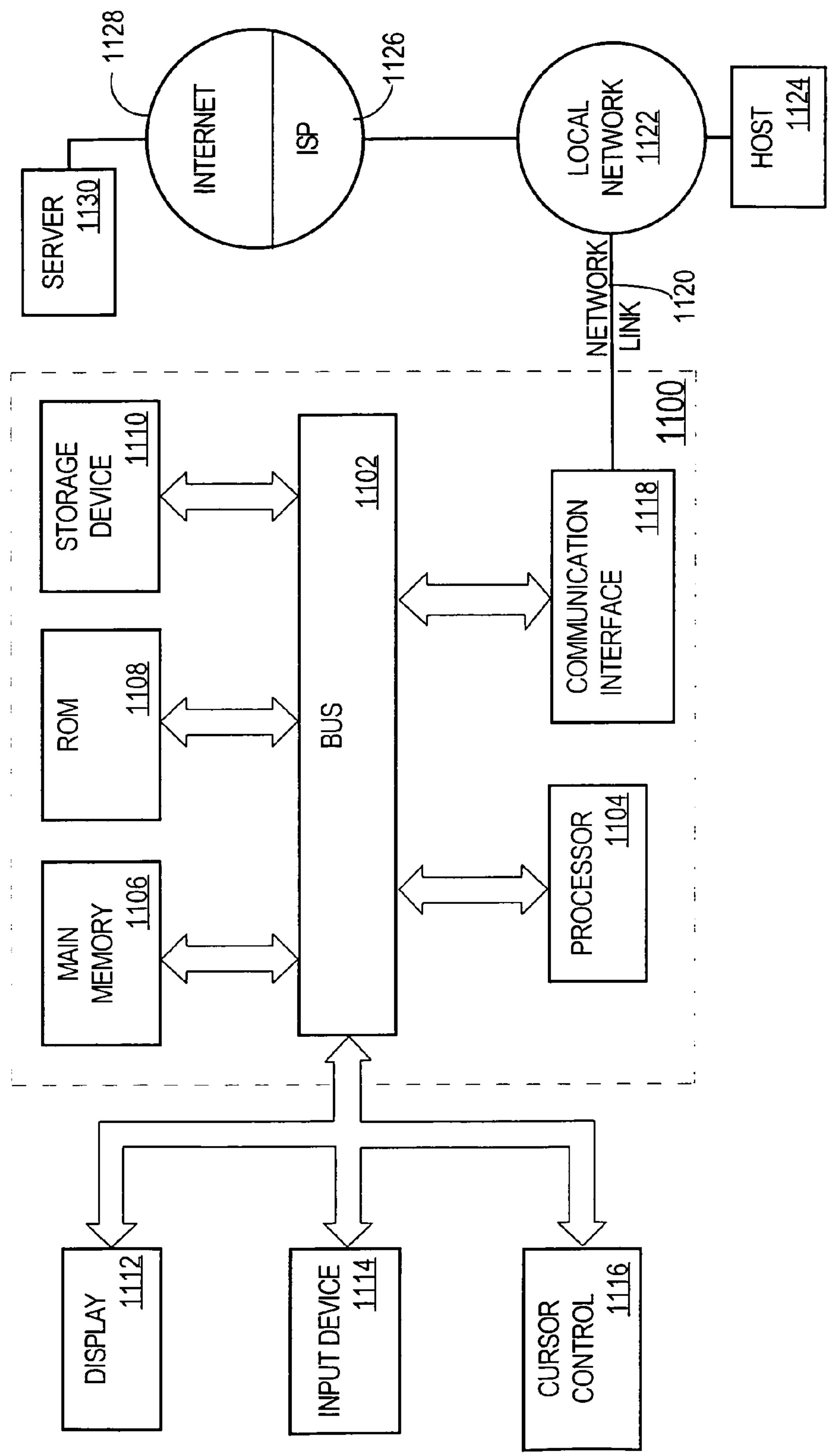
FIG. 11 is a block diagram of a computer system upon which embodiments of the invention may be implemented.

FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another machine-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1100, various machine-readable media are involved, for example, in providing instructions to processor 1104 for execution. Such a medium may take many forms, including but not limited to, non-volatile media and volatile media. Non-volatile media includes, for example, optical or magnetic disks, such as storage device 1110. Volatile media includes dynamic memory, such as main memory 1106.

Common forms of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector can receive the data carried in the infrared signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic or optical signals that carry digital data streams.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage device 1110, or other non-volatile storage for later execution.

The novel approach described herein for renting items to customers allows the decision of what items to rent to be separated from the decision of when to rent the items. Customers may specify what items to rent using the item selection criteria and receive the items at a future point in time, without having to go to the provider to pick up the items. The selection criteria may be user specific and may indicate a desired fulfillment sequence. Furthermore, customers are not constrained by conventional due dates and instead may establish continuous, serialized rental streams of items. The approach also allows more efficient inventory management.

The "Max Out" approach for inventory management allows users to maintain their own inventory of items that are periodically replaced by other items according to specified event criteria. The event criteria that trigger sending another item to a customer are very flexible and may be tailored to the requirements of a particular application. For example, as described herein, the event criteria may include a return of any of the items currently in use by the customer or merely customer notification. This is very convenient in the context of movie rentals since the return of a movie to the provider automatically triggers the sending of another movie to the customer. The "Max Turns" approach for inventory management, when used alone or in combination with "Max Out," provides even greater flexibility for customers and providers. The max number of turns can be selected individually for particular customers depending upon their particular needs.

The "Max Out" and "Max Turns" approaches provide great flexibility in establishing subscription models to satisfy the needs of a particular application. Specifically, the size and replacement frequency of customer inventories can be tailored to each customer with individualized subscription plans.

In the foregoing specification, the invention has been described as applicable to an implementation anticipating Internet based ordering and mail or other long-distance delivery of the items, where the special advantages of the method are very attractive. However the same invention may be applied in a more conventional video, games, or music rental-store setting, where subscription customers may be allowed rentals of a specified number of movies, games, or music selections at any time, and/or in one subscription period, without rental return due dates, in exchange for a periodic rental subscription fee.

In the foregoing specification, embodiments of the invention have been described with reference to numerous specific details that may vary from implementation to implementation. Thus, the sole and exclusive indicator of what is, and is intended-by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for estimating how a particular user of a plurality of users would rate a particular item, from a plurality of items, that the particular user has not yet rated, the method comprising the steps of:

a computer system identifying, from the plurality of items, one or more reference items that have ratings similar to ratings of the particular item that the particular user has not yet rated;

a computer system identifying, based on the one or more reference items that have ratings similar to ratings of the particular item that the particular user has not yet rated, one or more other users of the plurality of users that have given ratings to the one or more reference items that are substantially similar to ratings given by the particular user to the one or more reference items;

a computer system generating an estimation of how the particular user would rate the particular item based upon ratings for the particular item given to the particular item by the one or more other users.

2. The machine implemented method as recited in claim 1, wherein the step of identifying, from the plurality of items, one or more reference items that have ratings similar to the particular item is performed off-line in advance of the other steps.

3. The machine-implemented method as recited in claim 1, wherein identifying one or more reference items from a plurality of items that have ratings similar to the particular item includes calculating a statistical correlation between the particular item and the other items from the plurality of items.

4. The machine-implemented method as recited in claim 1, further comprising the machine-implemented step of determining whether the particular item and each of the one or more reference items have at least a specified number of co-ratings.

5. The machine-implemented method as recited in claim 1, further comprising the machine-implemented step of determining whether the particular item and one of the one or more reference items have at least a specified fraction of co-ratings between the particular item and the one of the one or more reference items divided by the number of ratings of either the particular item or the one of the one or more reference items.

6. The machine-implemented method as recited in claim 1, wherein the step of identifying one or more reference items from the plurality of items that have ratings similar to the particular item includes identifying whether the particular item and the one or more reference items have a number of co-raters greater than a specified fraction of a statistically expected number, given the number of ratings of each item counted separately.

7. The machine-implemented method as recited in claim 1, wherein the step of identifying one or more reference items from the plurality of items that have ratings similar to the particular item includes consideration of one or more of a statistical correlation between the particular item and the one or more reference items, whether the particular item and the one or more reference items have at least a specified number of co-ratings, whether the particular item and the one or more reference items have at least a specified fraction of co-ratings, and whether the particular item and the one or more reference items have at least a specified fraction of the statistically expected number of co-ratings.

8. The machine-implemented method as recited in claim 1, further comprising the machine-implemented step of selecting the one or more other users from a plurality of other users based upon each of the one or more other users having at least a specified minimum number of ratings.

9. The machine-implemented method as recited in claim 1, further comprising the machine-implemented step of selecting the one or more other users from a plurality of other users based upon each of the one or more other users having less than a specified maximum number of ratings.

10. The machine-implemented method as recited in claim 1, further comprising the machine-implemented step of selecting the one or more other users from a plurality of other users based upon each of the one or more other users having an average rating within a specified range.

11. The machine-implemented method as recited in claim 1, further comprising the machine-implemented step of selecting the one or more other users from a plurality of other users based upon each of the one or more other users having a rating distribution within a specified tolerance of a Normal distribution.

12. The machine-implemented method as recited in claim 1, further comprising the machine-implemented step of selecting the one or more other users from a plurality of other users based upon each of the one or more other users having a rating standard deviation within a specified range.

13. The machine-implemented method as recited in claim 1, wherein identifying one or more other users that have given ratings to the one or more reference items that are substantially similar to ratings given by the particular user to the one or more reference items includes consideration of one or more of whether the one or more other users have at least a specified minimum number of co-ratings, whether the one or more other users have less than a specified maximum number of ratings, whether the one or more other users have an average rating within a specified range, whether the one or more other users have a rating distribution within a specified tolerance of a Normal distribution, and whether the one or more other users have a rating standard deviation within a specified range.

14. The machine-implemented method as recited in claim 1, wherein identifying the one or more other users includes choosing the one or more other users for whom a statistical correlation with the particular user of co-ratings of the one or more reference items is greater than a specified threshold.

15. The machine-implemented method as recited in claim 1, wherein identifying the one or more other users includes choosing the one or more other users for whom a vector cosine distance of co-ratings of the one or more reference items is smaller than a specified threshold.

16. The machine-implemented method as recited in claim 1, wherein identifying the one or more other users includes choosing the one or more other users who have co-rated a subset of the one or more reference items exactly the same as the particular user.

17. The machine-implemented method as recited in claim 1, wherein identifying the one or more other users includes choosing the one or more other users who have rated co-rated a subset of the one or more reference items within a specified threshold of the ratings by the particular user.

18. The machine-implemented method as recited in claim 1, wherein identifying the one or more other users includes consideration of one or more of whether the one or more users have a correlation of co-ratings of the one or more reference items greater than a specified threshold, whether the one or more users have a vector cosine distance of co-ratings of the one or more reference items smaller than a specified threshold, whether the one or more users have co-rated a subset of the one or more reference items exactly the same, and whether the one or more users having co-rated a subset of the one or more reference items within a specified threshold of the ratings by the particular user.

19. The machine-implemented method as recited in claim 1, wherein identifying the one or more other users includes choosing a specified number of other users most similar to the particular user.

20. The machine-implemented method as recited in claim 1, wherein identifying the one or more other users includes choosing other users whose similarity to the particular user is better than a specified threshold.

21. The machine-implemented method as recited in claim 1, wherein identifying the one or more other users includes choosing up to a specified number of other users most similar to the particular user, where all the chosen other users have similarity better than a specified threshold.

22. The machine-implemented method as recited in claim 1, wherein generating an estimation of how the user would rate the particular item based upon ratings for the particular item given by the one or more other users includes determining an average rating of the particular item by the one or more other users.

23. The machine-implemented method as recited in claim 1, wherein generating an estimation of how the particular user would rate the particular item based upon ratings for the particular item given by the one or more other users includes determining an average rating of the particular item by the one or more other users.

24. The machine-implemented method as recited in claim 1, further comprising the machine-implemented steps of:

generating, for each of the one or more users, a separate estimation of how the particular user would rate the particular item based upon the rating for the particular item given by each of the one or more other users, and calculating a confidence metric based upon disparities between the separate estimations.

25. The machine-implemented method as recited in claim 1, wherein the plurality of items is a plurality of movies, the one or more reference items is one or more movies and the particular item is a particular movie.

26. The machine-implemented method as recited in claim 1, wherein the plurality of items is a plurality of music items, the one or more reference items is one or more music items and the particular item is a particular music item.

27. The machine-implemented method of claim 1, wherein:

generating an estimation of how the particular user would rate the particular item based upon ratings for the particular item given by the one or more other users includes determining a similarity between the ratings given by the one or more other users to the one or more reference items and the ratings given by the particular user to the one or more reference items.

28. A volatile or non-volatile machine-readable storage medium for estimating how a particular user of a plurality of users would rate a particular item, from a plurality of items, that the particular user has not yet rated, the machine-readable storage medium storing instructions which, when processed by one or more processors, cause performance of the steps of:

identifying, from the plurality of items, one or more reference items that have ratings similar to ratings of the particular item that the particular user has not yet rated;

identifying, based on the one or more reference items that have ratings similar to ratings of the particular item that the particular user has not yet rated, one or more other users of the plurality of users that have given ratings to the one or more reference items that are substantially similar to ratings given by the particular user to the one or more reference items;

generating an estimation of how the particular user would rate the particular item based upon ratings for the particular item given to the particular item by the one or more other users.

29. The volatile or non-volatile machine-readable storage medium as recited in claim 28, wherein the step of identifying, from the plurality of items, one or more other items that have ratings similar to the particular item is performed off line in advance of the other steps.

30. The volatile or non-volatile machine-readable storage medium as recited in claim 28, wherein identifying one or more reference items from a plurality of items that have ratings similar to the particular item includes calculating a statistical correlation between the particular item and the other items from the plurality of items.

31. The volatile or non-volatile machine-readable storage medium as recited in claim 28, further comprising one or more additional instructions which, when processed by the one or more processors, cause the one or more processors to perform the additional step of determining whether the particular item and each of the one or more reference items have at least a specified number of co-ratings.

32. The volatile or non-volatile machine-readable storage medium as recited in claim 28, further comprising one or more additional instructions which, when processed by the one or more processors, cause the one or more processors to perform the additional step of determining whether the particular item and one of the one or more reference items have at least a specified fraction of co-ratings between the particular item and the one of the one or more reference items divided by the number of ratings of either the particular item or the one of the one or more reference items.

33. The volatile or non-volatile machine-readable storage medium as recited in claim 28, wherein the step of identifying one or more reference items from the plurality of items that have ratings similar to the particular item includes identifying whether the particular item and the one or more reference items have a number of co-raters greater than a specified fraction of a statistically expected number, given the number of ratings of each item counted separately.

34. The volatile or non-volatile machine-readable storage medium as recited in claim 28, wherein the step of identifying one or more reference items from the plurality of items that have ratings similar to the particular item includes consideration of one or more of a statistical correlation between the particular item and the one or more reference items, whether the particular item and the one or more reference items have at least a specified number of co-ratings, whether the particular item and the one or more reference items have at least a specified fraction of co-ratings, and whether the particular item and the one or more reference items have at least a specified fraction of the statistically expected number of co-ratings.

35. The volatile or non-volatile machine-readable storage medium as recited in claim 28, further comprising one or more additional instructions which, when processed by the one or more processors, cause the one or more processors to perform the additional step of selecting the one or more other users from a plurality of other users based upon each of the one or more other users having at least a minimum number of ratings.

36. The volatile or non-volatile machine-readable storage medium as recited in claim 28, further comprising one or more additional instructions which, when processed by the one or more processors, cause the one or more processors to perform the additional step of selecting the one or more other users from a plurality of other users based upon each of the one or more other users having less than a maximum number of ratings.

37. The volatile or non-volatile machine-readable storage medium as recited in claim 28, further comprising one or more additional instructions which, when processed by the one or more processors, cause the one or more processors to perform the additional step of selecting the one or more other users from a plurality of other users based upon each of the one or more other users having an average rating within a specified range.

38. The volatile or non-volatile machine-readable storage medium as recited in claim 28, further comprising one or more additional instructions which, when processed by the one or more processors, cause the one or more processors to perform the additional step of selecting the one or more other users from a plurality of other users based upon each of the one or more other users having a rating distribution within a specified tolerance of a Normal distribution.

39. The volatile or non-volatile machine-readable storage medium as recited in claim 28, further comprising one or more additional instructions which, when processed by the one or more processors, cause the one or more processors to perform the additional step of selecting the one or more other users from a plurality of other users based upon each of the one or more other users having a rating standard deviation within a specified range.

40. The volatile or non-volatile machine-readable storage medium as recited in claim 28, wherein identifying one or more other users that have given ratings to the one or more reference items that are substantially similar to ratings given by the particular user to the one or more reference items includes consideration of one or more of whether the one or more other users have at least a specified minimum number of co-ratings, whether the one or more other users have less than a specified maximum number of ratings, whether the one or more other users have an average rating within a specified range, whether the one or more other users have a rating distribution within a specified tolerance of a Normal distribution, and whether the one or more other users have a rating standard deviation within a specified range.

41. The volatile or non-volatile machine-readable storage medium as recited in claim 28, wherein identifying the one or more other users includes choosing the one or more other users for whom a statistical correlation with the particular user of co-ratings of the one or more reference items is greater than a specified threshold.

42. The volatile or non-volatile machine-readable storage medium as recited in claim 28, wherein identifying the one or more other users includes choosing the one or more other users for whom a vector cosine distance of co-ratings of the one or more reference items is smaller than a specified threshold.

43. The volatile or non-volatile machine-readable storage medium as recited in claim 28, wherein identifying the one or more other users includes choosing the one or more other users who have co-rated a subset of the one or more reference items exactly the same as the particular user.

44. The volatile or non-volatile machine-readable storage medium as recited in claim 28, wherein identifying the one or more other users includes choosing the one or more other users who have rated co-rated a subset of the one or more reference items within a specified threshold of the ratings by the particular user.

45. The volatile or non-volatile machine-readable storage medium as recited in claim 28, wherein identifying the one or more other users includes consideration of one or more of whether the one or more users have a correlation of co-ratings of the one or more reference items greater than a specified threshold, whether the one or more users have a vector cosine distance of co-ratings of the one or more reference items smaller than a specified threshold, whether the one or more users have co-rated a subset of the one or more reference items exactly the same, and whether the one or more users having co-rated a subset of the one or more reference items within a specified threshold of the ratings by the particular user.

46. The volatile or non-volatile machine-readable storage medium as recited in claim 28, wherein identifying the one or more other users includes choosing a specified number of other users most similar to the particular user.

47. The volatile or non-volatile machine-readable storage medium as recited in claim 28, wherein identifying the one or more other users includes choosing other users whose similarity to the particular user is better than a specified threshold.

48. The volatile or non-volatile machine-readable storage medium as recited in claim 28, wherein identifying the one or more other users includes choosing up to a specified number of other users most similar to the particular user, where all the chosen other users have similarity better than a specified threshold.

49. The volatile or non-volatile machine-readable storage medium as recited in claim 28, wherein generating an estimation of how the particular user would rate the particular item based upon ratings for the particular item given by the one or more other users includes determining an average rating of the particular item by the one or more other users.

50. The volatile or non-volatile machine-readable storage medium as recited in claim 28, wherein generating an estimation of how the particular user would rate the particular item based upon ratings for the particular item given by the one or more other users includes determining an average rating of the particular item by the one or more other users.

51. The volatile or non-volatile machine-readable storage medium as recited in claim 28, further comprising one or more additional instructions which, when processed by the one or more processors, cause the one or more processors to perform the additional steps of:

generating, for each of the one or more users, a separate estimation of how the particular user would rate the particular item based upon the rating for the particular item given by each of the one or more other users, and calculating a confidence metric based upon disparities between the separate estimations.

52. The volatile or non-volatile machine-readable storage medium as recited in claim 28, wherein the plurality of items is a plurality of movies, the one or more reference items is one or more movies and the particular item is a particular movie.

53. The volatile or non-volatile machine-readable storage medium as recited in claim 28, wherein the plurality of items is a plurality of music items, the one or more reference items is one or more music items and the particular item is a particular music item.

54. The volatile or non-volatile machine-readable storage medium of claim 28, wherein:

the instructions for generating an estimation of how the particular user would rate the particular item based upon ratings for the particular item given by the one or more other users includes instructions for determining a similarity between the ratings given by the one or more other users to the one or more reference items and the ratings given by the particular user to the one or more reference items.

55. An apparatus for estimating how a particular user of a plurality of users would rate a particular item, from a plurality of items, that the particular user has not yet rated, the apparatus comprising:

means for identifying, from the plurality of items, one or more reference items that have ratings similar to ratings of the particular item that the particular user has not yet rated;

means for identifying, based on the one or more reference items that have ratings similar to ratings of the particular item that the particular user has not yet rated, one or more other users of the plurality of users that have given ratings to the one or more reference items that are substantially similar to ratings given by the particular user to the one or more reference items;

means for generating an estimation of how the particular user would rate the particular item based upon ratings for the particular item given to the particular item by the one or more other users.

56. The apparatus as recited in claim 55, wherein the means for identifying, from the plurality of items, one or more other items that have ratings similar to the particular item is operable off-line in advance of the other steps.

57. The apparatus as recited in claim 55, wherein the means for identifying one or more reference items from a plurality of items that have ratings similar to the particular item includes means for calculating a statistical correlation between the particular item and the other items from the plurality of items.

58. The apparatus as recited in claim 55, further comprising:

means for determining whether the particular item and each of the one or more reference items have at least a specified number of co-ratings.

59. The apparatus as recited in claim 55, further comprising:

means for determining whether the particular item and one of the one or more reference items have at least a specified fraction of co-ratings between the particular item and the one of the one or more reference items divided by the number of ratings of either the particular item or the one of the one or more reference items.

60. The apparatus as recited in claim 55, wherein the means for identifying one or more reference items from the plurality of items that have ratings similar to the particular item includes means for identifying whether the particular item and the one or more reference items have a number of co-raters greater than a specified fraction of a statistically expected number, given the number of ratings of each item counted separately.

61. The apparatus as recited in claim 55, wherein the means for identifying one or more reference items from the plurality of items that have ratings similar to the particular item includes means for consideration of one or more of a statistical correlation between the particular item and the one or more reference items, whether the particular item and the one or more reference items have at least a specified number of co-ratings, whether the particular item and the one or more reference items have at least a specified fraction of co-ratings, and whether the particular item and the one or more reference items have at least a specified fraction of the statistically expected number of co-ratings.

62. The apparatus as recited in claim 55, further comprising:

means for selecting the one or more other users from a plurality of other users based upon each of the one or more other users having at least a minimum number of ratings.

63. The apparatus as recited in claim 55, further comprising:

means for selecting the one or more other users from a plurality of other users based upon each of the one or more other users having less than a maximum number of ratings.

64. The apparatus as recited in claim 55, further comprising:

means for selecting the one or more other users from a plurality of other users based upon each of the one or more other users having an average rating within a specified range.

65. The apparatus as recited in claim 55, further comprising:

means for selecting the one or more other users from a plurality of other users based upon each of the one or more other users having a rating distribution within a specified tolerance of a Normal distribution.

66. The apparatus as recited in claim 55, further comprising:

means for selecting the one or more other users from a plurality of other users based upon each of the one or more other users having a rating standard deviation within a specified range.

67. The apparatus as recited in claim 55, wherein the means for identifying one or more other users that have given ratings to the one or more reference items that are substantially similar to ratings given by the particular user to the one or more reference items includes means for consideration of one or more of whether the one or more other users have at least a specified minimum number of co-ratings, whether the one or more other users have less than a specified maximum number of ratings, whether the one or more other users have an average rating within a specified range, whether the one or more other users have a rating distribution within a specified tolerance of a Normal distribution, and whether the one or more other users have a rating standard deviation within a specified range.

68. The apparatus as recited in claim 55, wherein the means for identifying the one or more other users includes means for choosing the one or more other users for whom a statistical correlation with the particular user of co-ratings of the one or more reference items is greater than a specified threshold.

69. The apparatus as recited in claim 55, wherein the means for identifying the one or more other users includes means for choosing the one or more other users for whom a vector cosine distance of co-ratings of the one or more reference items is smaller than a specified threshold.

70. The apparatus as recited in claim 55, wherein the means for identifying the one or more other users includes means for choosing the one or more other users who have co-rated a subset of the one or more reference items exactly the same as the particular user.

71. The apparatus as recited in claim 55, wherein the means for identifying the one or more other users includes means for choosing the one or more other users who have rated co-rated a subset of the one or more reference items within a specified threshold of the ratings by the particular user.

72. The apparatus as recited in claim 55, wherein the means for identifying the one or more other users includes means for consideration of one or more of whether the one or more users have a correlation of co-ratings of the one or more reference items greater than a specified threshold, whether the one or more users have a vector cosine distance of co-ratings of the one or more reference items smaller than a specified threshold, whether the one or more users have co-rated a subset of the one or more reference items exactly the same, and whether the one or more users having co-rated a subset of the one or more reference items within a specified threshold of the ratings by the particular user.

73. The apparatus as recited in claim 55, wherein the means for identifying the one or more other users includes means for choosing a specified number of other users most similar to the particular user.

74. The apparatus as recited in claim 55, wherein the means for identifying the one or more other users includes means for choosing other users whose similarity to the particular user is better than a specified threshold.

75. The apparatus as recited in claim 55, wherein means for identifying the one or more other users includes means for choosing up to a specified number of other users most similar to the particular user, where all the chosen other users have similarity better than a specified threshold.

76. The apparatus as recited in claim 55, wherein the means for generating an estimation of how the particular user would rate the particular item based upon ratings for the particular item given by the one or more other users includes means for determining an average rating of the particular item by the one or more other users.

77. The apparatus as recited in claim 55, wherein the means for generating an estimation of how the particular user would rate the particular item based upon ratings for the particular item given by the one or more other users includes means for determining an average rating of the particular item by the one or more other users.

78. The apparatus as recited in claim 55, further comprising:

means for generating, for each of the one or more users, a separate estimation of how the particular user would rate the particular item based upon the rating for the particular item given by each of the one or more other users, and means for calculating a confidence metric based upon disparities between the separate estimations.

79. The apparatus as recited in claim 55, wherein the plurality of items is a plurality of movies, the one or more reference items is one or more movies and the particular item is a particular movie.

80. The apparatus as recited in claim 55, wherein the plurality of items is a plurality of music items, the one or more reference items is one or more music items and the particular item is a particular music item.

81. The apparatus of claim 55, wherein:

the means for generating an estimation of how the particular user would rate the particular item based upon ratings for the particular item given by the one or more other users includes means for determining a similarity between the ratings given by the one or more other users to the one or more reference items and the ratings given by the particular user to the one or more reference items.

* * * * *